(12) United States Patent
Chen et al.

(10) Patent No.: US 10,383,108 B2
(45) Date of Patent: Aug. 13, 2019

(54) DATA INTERFERENCE CANCELLATION METHOD, TRANSMIT END, RECEIVE END, AND SYSTEM

(71) Applicant: Huawei Technologies Co., Ltd., Shenzhen (CN)

(72) Inventors: Teyan Chen, Shenzhen (CN); Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 15/485,749

(22) Filed: Apr. 12, 2017

(65) Prior Publication Data

US 2017/0223688 A1 Aug. 3, 2017

Related U.S. Application Data

(63) Continuation of application No. PCT/CN2014/088485, filed on Oct. 13, 2014.

(51) Int. Cl.
| | |
|---|---|
| *H04B 7/06* | (2006.01) |
| *H04B 7/08* | (2006.01) |
| *H04L 5/00* | (2006.01) |
| *H04W 72/04* | (2009.01) |
| *H04B 17/345* | (2015.01) |
| *H04W 72/08* | (2009.01) |

(52) U.S. Cl.
CPC ............ *H04W 72/044* (2013.01); *H04B 7/06* (2013.01); *H04B 7/0691* (2013.01); *H04B 7/08* (2013.01); *H04B 17/345* (2015.01); *H04L 5/0053* (2013.01); *H04W 72/082* (2013.01)

(58) Field of Classification Search
CPC .................................................. H04W 72/044
See application file for complete search history.

(56) References Cited

U.S. PATENT DOCUMENTS

| | | | |
|---|---|---|---|
| 5,691,978 A | 11/1997 | Kenworthy | |
| 5,818,385 A * | 10/1998 | Bartholomew | H01Q 1/246 342/372 |
| 2013/0114468 A1 | 5/2013 | Hui et al. | |
| 2015/0071062 A1 | 3/2015 | Cheng et al. | |
| 2016/0127030 A1* | 5/2016 | Kim | H04B 7/0413 370/329 |
| 2016/0143013 A1* | 5/2016 | Kim | H04B 17/345 370/329 |

FOREIGN PATENT DOCUMENTS

| | | |
|---|---|---|
| CN | 101729091 A | 6/2010 |
| CN | 103023545 A | 4/2013 |
| CN | 103117970 A | 5/2013 |
| WO | 2014000449 A1 | 1/2014 |

* cited by examiner

*Primary Examiner* — Christopher M Crutchfield
*Assistant Examiner* — Alan L Lindenbaum
(74) *Attorney, Agent, or Firm* — Slater Matsil, LLP

(57) ABSTRACT

The present invention provides a data interference cancellation method, a transmit end, a receive end, and a system. The method includes allocating, by a transmit end, a corresponding downlink transmission resource to each transmission group, where at least one transmission group includes at least two transmit antennas and separately sending, by the transmit end, downlink data on the downlink transmission resource corresponding to each transmission group.

18 Claims, 14 Drawing Sheets

A transmit end allocates a corresponding downlink transmission resource to each transmission group — S101

The transmit end separately sends downlink data on the downlink transmission resource corresponding to each transmission group — S102

DATA INTERFERENCE CANCELLATION METHOD, TRANSMIT END, RECEIVE END, AND SYSTEM

CROSS-REFERENCE TO RELATED APPLICATIONS

This application is a continuation of International Patent Application No. PCT/CN2014/088485, filed on Oct. 13, 2014, the disclosure of which is hereby incorporated by reference in its entirety.

TECHNICAL FIELD

The present invention relates to the communications technologies, and in particular, to a data interference cancellation method, a transmit end, a receive end, and a system.

BACKGROUND

Different from an existing frequency division duplex (FDD for short) or time division duplex (TDD for short) technology, a wireless full-duplex technology allows receiving and sending operations simultaneously performed on a same wireless channel. Therefore, theoretically, spectral efficiency of the wireless full-duplex technology is twice as much as that of the FDD or TDD technology. A precondition for implementing wireless full-duplex is to avoid, reduce, or cancel self-interference caused by a transmit signal of a transceiver to a receive signal of the transceiver as much as possible, so as not to adversely affect correct reception of a wanted signal.

In an existing wireless full-duplex multiple-input multiple-output (MIMO for short) system, a strength of a self-interference signal obtained after space isolation performed by using a transmit and receive antenna is still far greater than a strength of a wanted signal. Therefore, generally, a data interference cancellation operation needs to be performed on the self-interference signal by combining a radio frequency self-interference cancellation (RF SIC for short) technology and a digital self-interference cancellation (Digital SIC for short) technology. In both a radio frequency interference cancellation process and a digital interference cancellation process, a self-interference channel needs to be estimated, that is, a channel between each transmit antenna and each receive antenna of a same transceiver. Generally, dedicated downlink transmission may be performed by using some half-duplex timeslots. A self-interference signal is received by using each receive antenna, and self-interference channel estimation is performed according to a received downlink signal. Specifically, each transmit antenna may perform downlink transmission by using a non-orthogonal time-frequency resource or an orthogonal time-frequency resource. Correspondingly, each receive antenna receives non-orthogonal self-interference signals or orthogonal self-interference signals from different transmit antennas. For a non-orthogonal self-interference signal, for example, in an orthogonal frequency division multiplexing (OFDM for short) system, if a quantity of transmit antennas is N, each receive antenna needs to solve N linear equations on each subcarrier to obtain a self-interference channel. For an orthogonal self-interference signal, the transmit antennas use orthogonal time-frequency resources. Therefore, each receive antenna does not need to solve equations, and performs channel estimation on each orthogonal time-frequency resource, so as to implement the self-interference channel estimation.

However, in the prior art, for a non-orthogonal self-interference signal, it is highly complex to implement the self-interference channel estimation. Therefore, it is also complex to perform interference cancellation on the non-orthogonal self-interference signal. For an orthogonal self-interference signal, the orthogonal self-interference signal is sent on an orthogonal time-frequency resource. Therefore, a resource is poorly utilized during interference cancellation performed on the orthogonal time-frequency resource.

SUMMARY

Embodiments of the present invention provide a data interference cancellation method, a transmit end, a receive end, and a system, so as to resolve a prior-art problem of high implementation complexity and low resource utilization during data interference cancellation.

According to a first aspect of the present embodiments, a data interference cancellation method is provided, including allocating, by a transmit end, a corresponding downlink transmission resource to each transmission group, where at least one transmission group includes at least two transmit antennas and separately sending, by the transmit end, downlink data on the downlink transmission resource corresponding to each transmission group.

In a first possible implementation manner, according to the first aspect, before the allocating, by a transmit end, a corresponding downlink transmission resource to each transmission group, the method further includes: grouping, by the transmit end, transmit antennas in all antenna arrays to obtain each transmission group; or receiving, by the transmit end, a configuration message of a management network element, and grouping transmit antennas according to the configuration message, where the configuration message includes grouping information of the transmit antennas.

In a second possible implementation manner, according to the first aspect and the first possible implementation manner, the allocating, by a transmit end, a corresponding downlink transmission resource to each transmission group includes: dividing, by the transmit end, the downlink transmission resource into resource blocks; and allocating, by the transmit end, a corresponding resource block to each transmission group.

In a third possible implementation manner, according to the second possible implementation manner, a quantity of resource blocks is L×L, and L is less than or equal to a quantity of transmission groups; and the allocating, by the transmit end, a corresponding resource block to each transmission group includes: allocating, by the transmit end, at least one resource block to each transmission group, where a resource block allocated to a transmission group does not overlap with that allocated to another transmission group; or allocating, by the transmit end, one unique resource block to each transmission group, and allocating each remaining resource block to at least two transmission groups.

In a fourth possible implementation manner, according to any one of the first aspect, or the first to the third possible implementation manners, before the sending, by the transmit end, downlink data on the downlink transmission resource corresponding to each transmission group, the method further includes: setting, by the transmit end, a distance between the antenna arrays according to types and operating frequencies of the antenna arrays in which the transmit antennas are located, so that isolation between the antenna arrays is greater than preset isolation.

According to a second aspect of the present embodiments, a data interference cancellation method is provided, including receiving, by a receive end, downlink data sent by a transmit end on a downlink transmission resource corresponding to each transmission group, where at least one transmission group includes at least two transmit antennas, and isolation between antenna arrays in which the transmit antennas are located is greater than preset isolation. The method also includes performing, by the receive end, interference cancellation on the downlink data in each antenna array, to obtain baseband data of each antenna array and estimating, by the receive end, a self-interference channel between the transmit end and the receive end according to the downlink data on the downlink transmission resource corresponding to each transmission group. Additionally, the method includes performing, by the receive end, digital interference cancellation on the baseband data of each antenna arrays according to the self-interference channel between the transmit end and the receive end, to obtain interference cancellation data.

According to a third aspect of the present embodiments, a transmit end is provided, including: an allocation module, configured to allocate a corresponding downlink transmission resource to each transmission group, where at least one transmission group includes at least two transmit antennas; and a sending module, configured to separately send downlink data on the downlink transmission resource corresponding to each transmission group.

In a first possible implementation manner, according to the third aspect, the transmit end further includes: a grouping module, configured to group transmit antennas in all antenna arrays to obtain each transmission group; or a receiving module, configured to receive a configuration message of a management network element, and group transmit antennas according to the configuration message, where the configuration message includes grouping information of the transmit antennas.

In a second possible implementation manner, according to the third aspect and the first possible implementation manner, the allocation module is specifically configured to: divide the downlink transmission resource into resource blocks; and allocate a corresponding resource block to each transmission group.

In a third possible implementation manner, according to the second possible implementation manner, a quantity of resource blocks is L×L, and L is less than or equal to a quantity of transmission groups; and the allocation module is specifically configured to: allocate at least one resource block to each transmission group, where a resource block allocated to a transmission group does not overlap with that allocated to another transmission group; or allocate one unique resource block to each transmission group, and allocate each remaining resource block to at least two transmission groups.

In a fourth possible implementation manner, according to the third aspect and the first to the third possible implementation manners, the transmit end further includes: a setting module, configured to set a distance between the antenna arrays according to types and operating frequencies of the antenna arrays in which the transmit antennas are located, so that isolation between the antenna arrays is greater than preset isolation.

According to a fourth aspect of the present embodiments, a receive end is provided, including: a receiving module, configured to receive downlink data sent by a transmit end on a downlink transmission resource corresponding to each transmission group, where at least one transmission group includes at least two transmit antennas, and isolation between antenna arrays in which the transmit antennas are located is greater than preset isolation; a first interference cancellation module, configured to perform interference cancellation on the downlink data in each antenna array, to obtain baseband data of each antenna array; an estimation module, configured to estimate a self-interference channel between the transmit end and the receive end according to the downlink data on the downlink transmission resource corresponding to each transmission group; and a second interference cancellation module, configured to perform digital interference cancellation on the baseband data of all the antenna arrays according to the self-interference channel between the transmit end and the receive end, to obtain interference cancellation data.

According to a fifth aspect of the present embodiments, a transmit end is provided, including: a processor, configured to allocate a corresponding downlink transmission resource to each transmission group, where at least one transmission group includes at least two transmit antennas; and a transmitter, configured to separately send downlink data on the downlink transmission resource corresponding to each transmission group.

The processor is further configured to group transmit antennas in all antenna arrays to obtain each transmission group; or the transmit end further includes: a receiver, configured to receive a configuration message of a management network element, and group transmit antennas according to the configuration message, where the configuration message includes grouping information of the transmit antennas.

In a second possible implementation manner, according to the fifth aspect and the first possible implementation manner, the processor is specifically configured to: divide the downlink transmission resource into resource blocks; and allocate a corresponding resource block to each transmission group.

In a third possible implementation manner, according to the second possible implementation manner, a quantity of resource blocks is L×L, and L is less than or equal to a quantity of transmission groups; and the processor is specifically configured to: allocate at least one resource block to each transmission group, where a resource block allocated to a transmission group does not overlap with that allocated to another transmission group; or allocate one unique resource block to each transmission group, and allocate each remaining resource block to at least two transmission groups.

In a fourth possible implementation manner, according to the fifth aspect and the first to the third possible implementation manners, the processor is further configured to: set a distance between the antenna arrays according to types and operating frequencies of the antenna arrays in which the transmit antennas are located, so that isolation between the antenna arrays is greater than preset isolation.

According to a sixth aspect of the present embodiments, a receive end is provided, including: a receiver, configured to receive downlink data sent by a transmit end on a downlink transmission resource corresponding to each transmission group, where at least one transmission group includes at least two transmit antennas, and isolation between antenna arrays in which the transmit antennas are located is greater than preset isolation; and a processor, configured to perform interference cancellation on the downlink data in each antenna array, to obtain baseband data of each antenna array, where the processor is further configured to estimate a self-interference channel between the transmit end and the receive end according to the downlink data on the downlink transmission resource corresponding to each transmission group; and the processor is further configured to perform digital interference cancellation on the baseband data of all the antenna arrays according to the self-interference channel between the transmit end and the receive end, to obtain interference cancellation data.

According to a seventh aspect of the present embodiments, a system is provided, including the transmit end according to the third aspect and the receive end according to the fifth aspect.

According to an eighth aspect of the present embodiments, a system is provided, including the transmit end according to the fourth aspect and the receive end according to the sixth aspect.

The embodiments of the present embodiments provide a data interference cancellation method, including: allocating, by a transmit end, a corresponding downlink transmission resource to each transmission group, where transmission group includes at least two transmit antennas; and separately sending, by the transmit end, downlink data on the downlink transmission resource corresponding to each transmission group. According to the technical solutions provided in the embodiments of the present invention, the transmit end performs downlink transmission resource allocation and downlink data transmission in a unit of a transmission group, and at least one transmission group includes at least two transmit antennas. That is, a quantity of transmission groups is less than a quantity of all transmit antennas. Therefore, complexity of implementing data interference cancellation can be reduced, and a resource can be more effectively utilized.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present embodiments.

Figure 1:
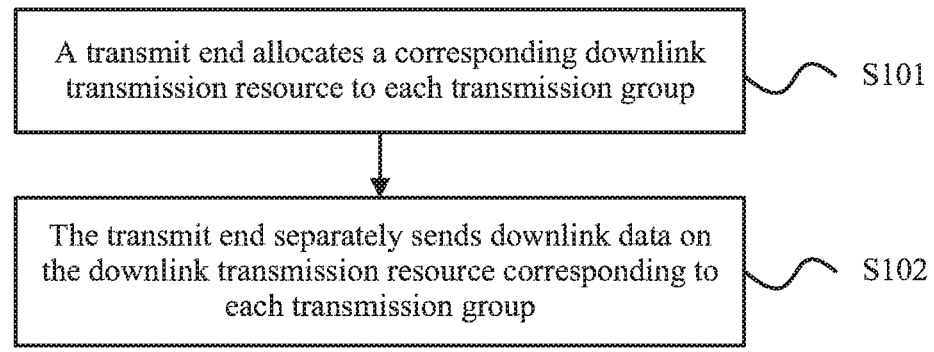
FIG. 1 is a schematic flowchart of a data interference cancellation method according to Embodiment 1 of the present invention.

FIG. 1 is a schematic flowchart of a data interference cancellation method according to Embodiment 1 of the present invention. As shown in FIG. 1, the method includes:

S101. A transmit end allocates a corresponding downlink transmission resource to each transmission group.

S102. The transmit end separately sends downlink data on the downlink transmission resource corresponding to each transmission group.

The foregoing steps are executed by a transmit end with a signal processing capability. For example, practically, the transmit end may be a base station in a wireless full-duplex multiple-input multiple-output (MIMO for short) system. Specifically, the MIMO system may be a massive MIMO system. That is, the system has hundreds of antennas, and a same time-frequency resource is used for simultaneously providing services for multiple terminals. According to different antenna configuration scenarios, the MIMO systems may be classified into two types: a massive MIMO system with co-site antennas and a massive MIMO system with distributed antennas. For example, the massive MIMO system with co-site antennas may be a system that includes a small quantity of antenna arrays and in which hundreds of antennas are configured in one or several antenna arrays.

The massive MIMO system with distributed antennas is a system that includes multiple antenna arrays and in which antennas are configured in each antenna array.

First, the transmit end allocates the corresponding downlink transmission resource to each transmission group. At least one transmission group includes at least two transmit antennas, that is, a quantity of all transmission groups in the system is less than a quantity of all transmit antennas in the system. In a feasible implementation manner, the transmit end may group transmit antennas according to an antenna array, that is, put transmit antennas of each antenna array into one group, so as to obtain each transmission group. In another feasible implementation manner, the transmit end may also receive a configuration message of a management network element, and group transmit antennas according to the configuration message. The configuration message includes grouping information of the transmit antennas.

Optionally, after each transmission group is determined, the transmit end may divide an available downlink transmission resource into blocks according to a quantity of transmit antennas in each transmission group and a quantity of all transmission groups, and allocate the corresponding downlink transmission resource to each transmission group.

Then, the transmit end may separately send the downlink data on the downlink transmission resource corresponding to each transmission group. Optionally, after receiving the downlink data, a receive end may perform self-interference channel estimation according to the downlink data on the downlink transmission resource corresponding to each transmission group, and perform an interference cancellation operation on the downlink data to obtain interference cancellation data. The self-interference channel herein refers to channels from transmit antennas to receive antennas in all the antenna arrays of the transmit end. In addition, the receive end has a signal processing capability. Practically, the receive end may be a base station in the wireless full-duplex MIMO system, that is, both the transmit end and the receive end in this embodiment are implemented in base stations in the full-duplex MIMO system.

It should be noted that the transmit antenna may be an antenna that is configured to transmit a radio signal in a full-duplex system, or may be an antenna that has capabilities of receiving and sending a radio signal but implements a sending function during execution of the technical solution in this embodiment. Likewise, the receive antenna may be an antenna that is configured to receive a radio signal in a full-duplex system, or may be an antenna that has capabilities of receiving and sending a radio signal but implements a receiving function during execution of the technical solution in this embodiment. This is not limited herein.

In addition, in the prior art, to cancel self-interference in a full-duplex MIMO system, three parts are generally included: antenna space isolation, radio frequency self-interference cancellation (RF SIC for short), and digital self-interference cancellation (Digital SIC for short), to cancel interference between antenna arrays and interference within an antenna array. The method according to this embodiment is applicable to a process in which: radio frequency interference cancellation has been properly performed, that is, after the radio frequency interference cancellation, self-interference between antenna arrays has been canceled and a part of self-interference within the antenna array has also been canceled; and self-interference channel estimation and data interference cancellation are performed during digital interference cancellation after a baseband signal whose interference may be canceled by means of digital interference cancellation is obtained. A manner in which the radio frequency interference cancellation is performed is not limited herein. Self-interference channel estimation may be performed according to the technical solution in this embodiment, to perform data interference cancellation, provided that enough baseband signals whose interference may be canceled by means of digital interference cancellation can be obtained.

In the prior art, in order that a receive end completes data interference cancellation, for a non-orthogonal self-interference signal, a transmit end needs to allocate a downlink transmission resource to each transmit antenna during self-interference channel estimation. In comparison with the prior art, in this embodiment, the transmit end performs downlink transmission resource allocation and downlink data transmission in a unit of a transmission group, and a quantity of all transmission groups is less than a quantity of all transmit antennas in a system. Therefore, in relative to resource occupation of a single transmit antenna, a resource is more effectively utilized according to the technical solution in this embodiment. In addition, in the prior art, for a non-orthogonal self-interference signal, when the receive end performs self-interference channel estimation, if the quantity of all the transmit antennas in the system is N, N linear equations need to be solved on each receive antenna to obtain a self-interference channel. However, in this embodiment, one transmission group is used as an example. It is assumed that the transmission group has n transmit antennas and the system is an orthogonal frequency division multiplexing (OFDM) system. By combining n OFDM symbols, the receive end may calculate n unknowns on each subcarrier covered by a downlink transmission resource allocated to the transmission group, so as to obtain channel estimation of a self-interference channel that is on a corresponding subcarrier and that is between each transmit antenna in the transmission group and each receive antenna in an antenna array, that is, the self-interference channel may be obtained by solving n linear equations on each receive antenna. Because n is a quantity of transmit antennas in one transmission group and is far less than the quantity N of all the transmit antennas in the system, complexity of implementing the technical solution in this embodiment is low.

According to the data interference cancellation method in this embodiment, a transmit end allocates a corresponding downlink transmission resource to each transmission group. At least one transmission group includes at least two transmit antennas. The transmit end separately sends downlink data on the downlink transmission resource corresponding to each transmission group. According to the technical solution provided in this embodiment of the present invention, the transmit end performs downlink transmission resource allocation and downlink data transmission in a unit of a transmission group. Therefore, complexity of implementing data interference cancellation can be reduced, and a resource can be more effectively utilized.

Figure 2:
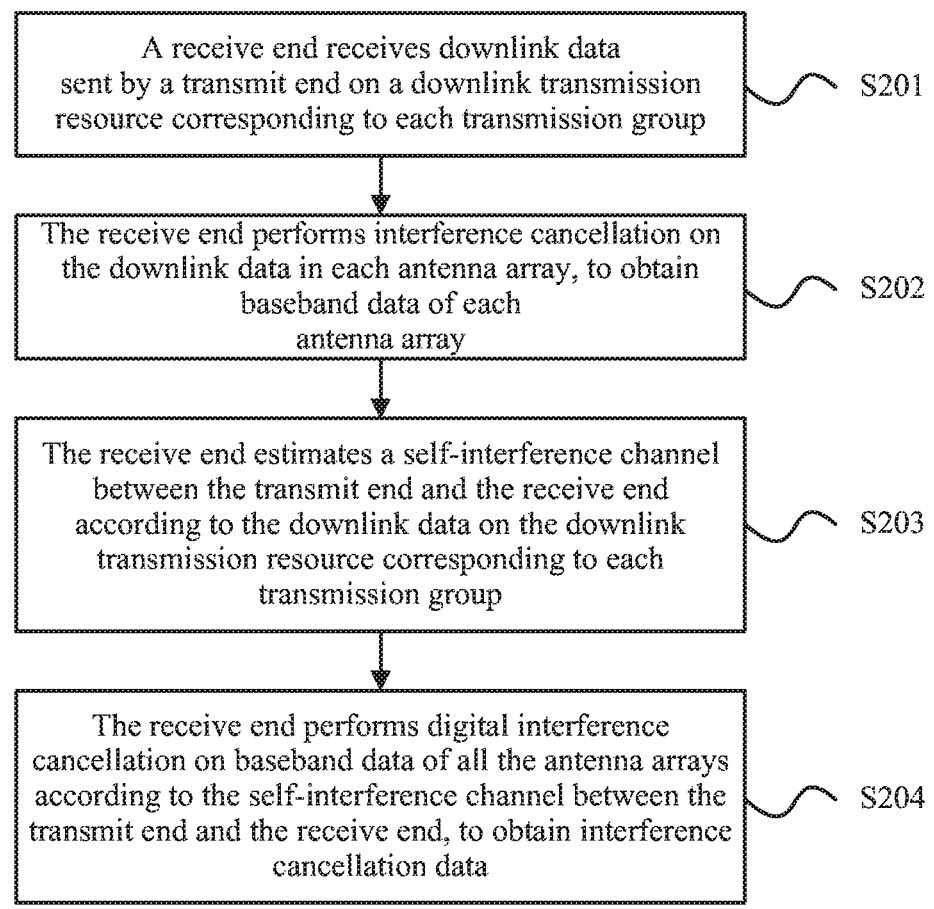
FIG. 2 is a schematic flowchart of a data interference cancellation method according to Embodiment 2 of the present invention.

FIG. 2 is a schematic flowchart of a data interference cancellation method according to Embodiment 2 of the present invention. As shown in FIG. 2, the method includes:

S201. A receive end receives downlink data sent by a transmit end on a downlink transmission resource corresponding to each transmission group.

S202. The receive end performs interference cancellation on the downlink data in each antenna array, to obtain baseband data of each antenna array.

S203. The receive end estimates a self-interference channel between the transmit end and the receive end according to the downlink data on the downlink transmission resource corresponding to each transmission group.

S204. The receive end performs digital interference cancellation on the baseband data of all the antenna arrays according to the self-interference channel between the transmit end and the receive end, to obtain interference cancellation data.

The foregoing steps are executed by a receive end that has a signal processing capability. For example, practically, the receive end may be a base station in a wireless full-duplex MIMO system.

First, the receive end receives the downlink data sent by the transmit end on the downlink transmission resource corresponding to each transmission group. At least one transmission group includes at least two transmit antennas, that is, a quantity of all transmission groups in the system is less than a quantity of all transmit antennas in the system. Isolation between antenna arrays in which the transmit antennas are located is greater than preset isolation.

In a feasible implementation manner, each transmission group may be obtained after the transmit end groups transmit antennas according to an antenna array, that is, after transmit antennas of each antenna array are put into one group. In another feasible implementation manner, each transmission group may be obtained after the transmit end receives a configuration message of a management network element and groups the transmit antennas according to the configuration message. The configuration message includes grouping information of the transmit antennas.

After receiving the downlink data, the receive end may perform interference cancellation on the downlink data in each antenna array, to obtain the baseband data of each antenna array. A specific implementation process of this step is the same as the process of obtaining baseband data of each antenna array in the prior art, and details are not described herein again. The isolation between the antenna arrays in which the transmit antennas are located is greater than the preset isolation. The preset isolation may be set according to an actual situation, to reduce interference between antenna arrays to a specific extent. Therefore, strain of radio frequency interference cancellation performed on each antenna array is reduced, and complexity of implementing interference cancellation in each antenna array is reduced.

Then, the receive end may estimate the self-interference channel between the transmit end and the receive end according to the downlink data on the downlink transmission resource corresponding to each transmission group. The self-interference channel herein refers to channels from transmit antennas to receive antennas in all antenna arrays of the transmit end.

After the self-interference channel is obtained, the receive end may perform digital interference cancellation on the baseband data of all the antenna arrays according to the self-interference channel, to obtain the interference cancellation data.

For example, for one transmission group, it is assumed that the transmission group has n transmit antennas, and a system is an OFDM system. By combining n OFDM symbols, the receive end may calculate n unknowns on each subcarrier covered by a downlink transmission resource allocated to the transmission group, so as to obtain channel estimation of a self-interference channel that is on a corresponding subcarrier and that is between each transmit antenna of the transmit antenna and each receive antenna in an antenna array. In comparison with the prior art, when the receive end performs self-interference channel estimation, if a quantity of all transmit antennas in the system is N, N linear equations need to be solved on each receive antenna to obtain the self-interference channel, so as to reduce complexity of implementing a self-interference channel in a digital interference cancellation process. Therefore, complexity of implementing the data interference cancellation method in this embodiment is low. In addition, because the downlink data in this embodiment is sent by using the downlink transmission resource corresponding to each transmission group, in relative to resource occupation of a single transmit antenna, a resource is more effectively utilized according to the technical solution in this embodiment.

According to the data interference cancellation method in this embodiment, a receive end receives downlink data sent by a transmit end on a downlink transmission resource corresponding to each transmission group. The receive end performs interference cancellation on the downlink data in each antenna array, to obtain baseband data of each antenna array. The receive end estimates a self-interference channel between the transmit end and the receive end according to the downlink data on the downlink transmission resource corresponding to each transmission group. The receive end performs digital interference cancellation on the baseband data of all the antenna arrays according to the self-interference channel between the transmit end and the receive end, to obtain interference cancellation data. According to the technical solution provided in this embodiment of the present invention, complexity of implementing self-interference channel estimation can be reduced, and a resource can be more effectively utilized.

Figure 3:
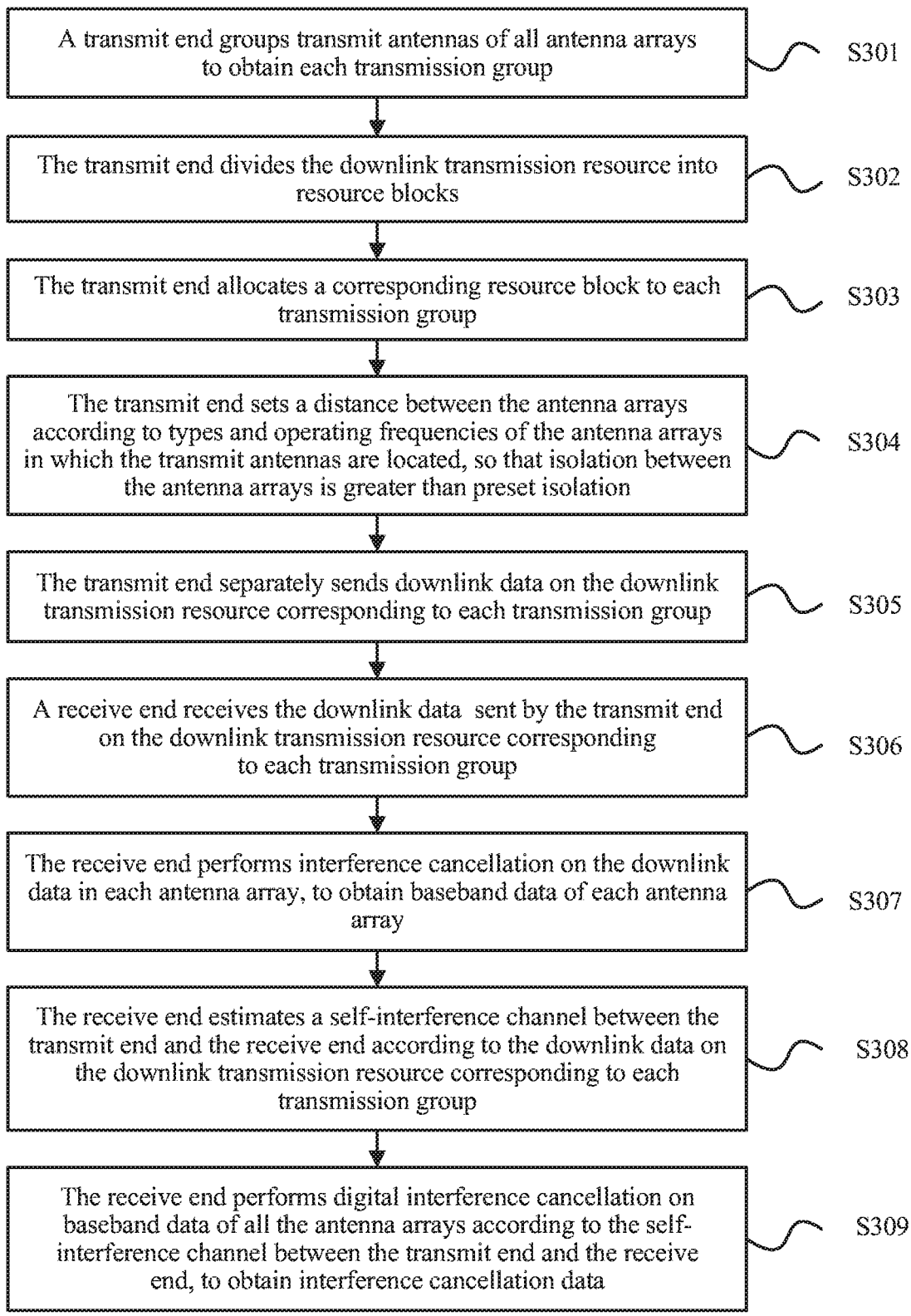
FIG. 3 is a schematic flowchart of a data interference cancellation method according to Embodiment 3 of the present invention.

FIG. 3 is a schematic flowchart of a data interference cancellation method according to Embodiment 3 of the present invention. An application scenario in this embodiment may be a massive MIMO system with distributed antennas. Steps S301 to S305 are executed by a transmit end, and steps S306 to S309 are executed by a receive end. Practically, the transmit end and the receive end may be implemented in base stations in a same full-duplex MIMO system. As shown in FIG. 3, the method includes:

S301. The transmit end groups transmit antennas in all antenna arrays to obtain each transmission group.

Specifically, description of this step is the same as that of step S101, and details are not described herein again.

In a feasible implementation manner, the transmit end may group the transmit antennas according to a quantity of all the antenna arrays and a quantity of transmit antennas of each antenna array, to obtain each transmission group. It is assumed that there are K antenna arrays in the system, and a quantity of transmit antennas configured for each antenna array does not exceed M. When K is greater than M, the transmit antennas may be put into K transmission groups according to an antenna array, that is, each antenna array is one group. Each antenna array has $M_k$ transmit antennas, and k=1, 2, . . . K, M=max$\{M_k\}$, and max represents an operation for calculating a maximum value. When downlink data is sent, each antenna array, that is, each transmission group, performs downlink transmission by using an orthogonal downlink transmission resource. Transmit antennas in a same antenna array are same in time and frequency in terms of downlink transmission resource corresponding to the transmit antennas, that is, the transmit antennas perform downlink transmission in an orthogonal manner. When K is less than M, one transmit antenna may be selected from each antenna array, and the transmit antennas are put into one group. If all transmit antennas in an antenna array are grouped, no transmit antenna is further selected from the antenna array. Finally, all the transmit antennas are put into M transmission groups. A quantity of transmit antennas in each transmission group is $K_m$, m=1, 2, . . . M, and K=max$\{K_m\}$. For example, if there are three antenna arrays in the system, and quantities of the three antenna arrays are respectively 2, 2, and 4, a first transmission group includes three transmit antennas that are separately selected from a first antenna array, a second antenna array, and a third antenna array, and a second transmission group includes three transmit antennas that are separately selected from the first antenna array, the second antenna array, and the third antenna array. Because each of the first antenna array and the second antenna array has only two transmit antennas, a third transmission group includes only one transmit antenna selected from the third antenna array, and a fourth antenna array also includes only one transmit antenna selected from the third antenna array.

In another feasible implementation manner, the transmit end may receive a configuration message of a management network element, and group transmit antennas according to the configuration message. The configuration message includes grouping information of the transmit antennas.

Certainly, the each transmission group may keep unchanged at each time of downlink data transmission, or may be adjusted at any time according to different channel statuses and an actual requirement.

S302. The transmit end divides the downlink transmission resource into resource blocks.

Specifically, the downlink transmission resource is generally a time domain resource and a frequency domain resource. Therefore, the downlink transmission resource may be divided into resource blocks whose time domains and frequency domains are interleaved, that is, each resource block occupies a specific time domain resource and a specific frequency domain resource. Downlink transmission resources occupied by resource blocks do not overlap with each other.

It is assumed that N transmit antennas are put into K transmission groups, and a quantity of transmit antennas of a $k^{th}$ transmission group is denoted as $M_k$ (this mark is inherited in the following unless otherwise specified). For resource block division, generally, in a full-duplex system, there is a downlink half-duplex timeslot (that is, a downlink transmission timeslot) that can be used for self-interference channel estimation. Therefore, a resource of the downlink half-duplex timeslot, that is, the downlink transmission resource, may be divided into L×L resource blocks, and L is less than or equal to K. The resource blocks are allocated to the K transmission groups.

Certainly, the L×L resource blocks may not have a same size. In a specific operation, a size of each resource block may be determined according to an actual requirement.

S303. The transmit end allocates a corresponding resource block to each transmission group.

Specifically, according to the downlink transmission timeslot, there may be the following two different allocation manners.

(1) Divide the downlink transmission resource of the downlink transmission timeslot into L×L resource blocks, and L is less than or equal to a quantity of transmission groups.

In this case, specifically, there may be the following different allocation manners.

(i) Interleaving Allocation

Specifically, the transmit end may allocate at least one resource block to each transmission group. A resource block allocated to a transmission group does not overlap with that allocated to another transmission group. That is, it is ensured that downlink transmission resources corresponding to the transmission groups are orthogonal to each other, and each resource block is corresponding to only one transmission group.

Figure 4A:
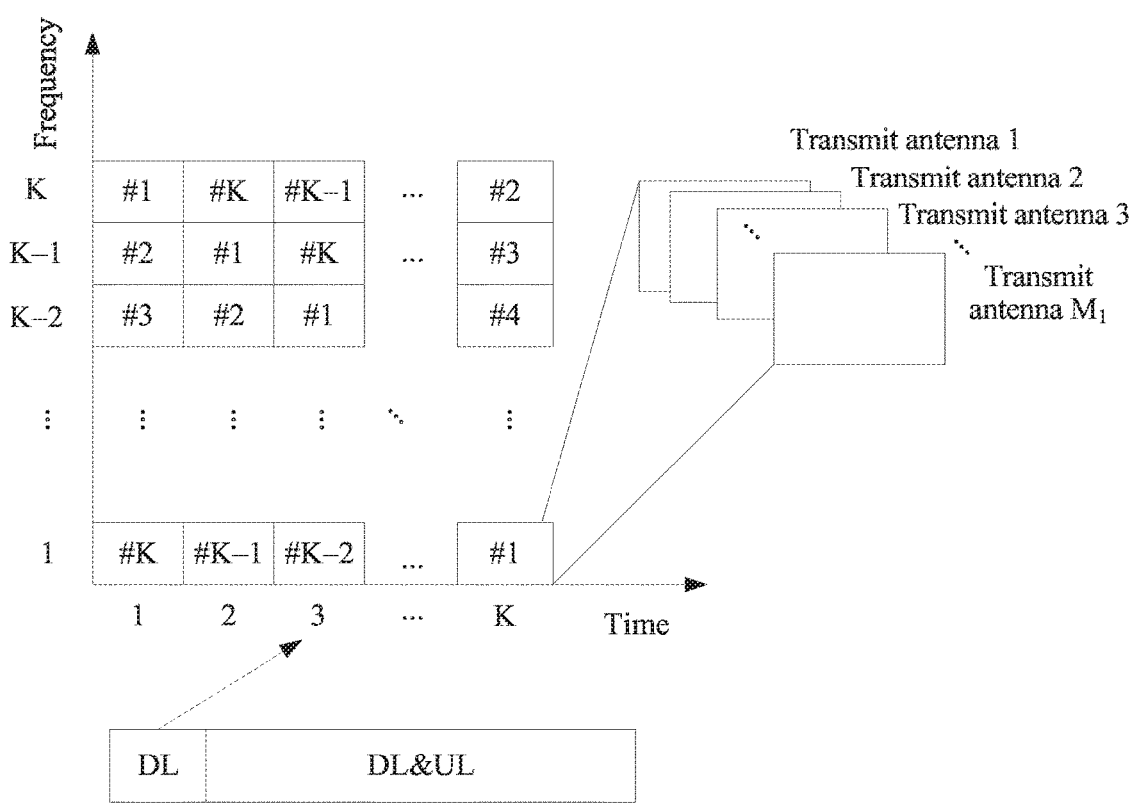
FIG. 4a is a schematic diagram of downlink half-duplex timeslot resource block allocation according to Embodiment 3 of the present invention.

If L is equal to the quantity K of transmission groups, the transmit end divides the downlink transmission resource into K×K resource blocks. In this case, as shown in FIG. 4a, the horizontal axis is a time axis, and the vertical axis is a frequency axis. The time axis may be divided into K time blocks, and a frequency domain axis may be divided into K frequency domain blocks. K×K resource blocks are allocated to the K transmission groups. A box labeled with # represents a resource block, a number following # is a group number of a transmission group corresponding to the resource block. For example, in a transmission group 1 in the figure, a blank box represents $M_k$ transmit antennas of the transmission group (this mark is inherited in the following unless otherwise specified). It can be seen that each transmission group may be divided into K resource blocks. A DL timeslot in FIG. 4a represents a downlink half-duplex timeslot used for self-interference channel estimation, and a DL&UL timeslot represents a timeslot used for full-duplex transmission. Meaning of a DL and that of a DL&UL in a subsequent accompanying drawing are the same as those described herein, and details are not described again.

A $k^{th}$ transmission group is used as an example, and $M_k$ transmit antennas in the transmission group send, in a manner of same time and same frequency, that is, a non-orthogonal manner, downlink data on the K resource blocks obtained by means of division. Resource blocks used by different transmission groups are orthogonal to each other. Therefore, for each resource block, non-orthogonal downlink data, that is, a self-interference signal, received by each receive antenna is an interference signal sent by a transmit antenna in a transmission group. Therefore, for the $k^{th}$ transmission group, the receive end needs to calculate, by combining $M_k$ symbols, $M_k$ unknowns on each subcarrier (it is assumed that an OFDM signal is sent in the system) covered by the K resource blocks corresponding to the $k^{th}$ transmission group, so as to obtain channel estimation of a self-interference channel that is on corresponding subcarrier and that is between a transmit antenna in the transmission group and each receive antenna in the system. Similarly, the receive end may also obtain, from remaining K−1 resource blocks corresponding to the transmission group, channel estimation of a self-interference channel that is on corresponding remaining subcarriers and that is between each of transmit antennas in the group and each receive antenna in the system, so as to perform data interference cancellation.

If L is less than the quantity K of transmission groups, the transmit end divides the downlink transmission resource into L×L resource blocks. Different from the first allocation manner, herein, although though there are K transmission groups, the downlink transmission resource is divided into only L×L resource blocks when the downlink transmission resource is divided. Because L is less than K, there may be different allocation manners for allocating a resource block to each transmission group.

Figure 4B:
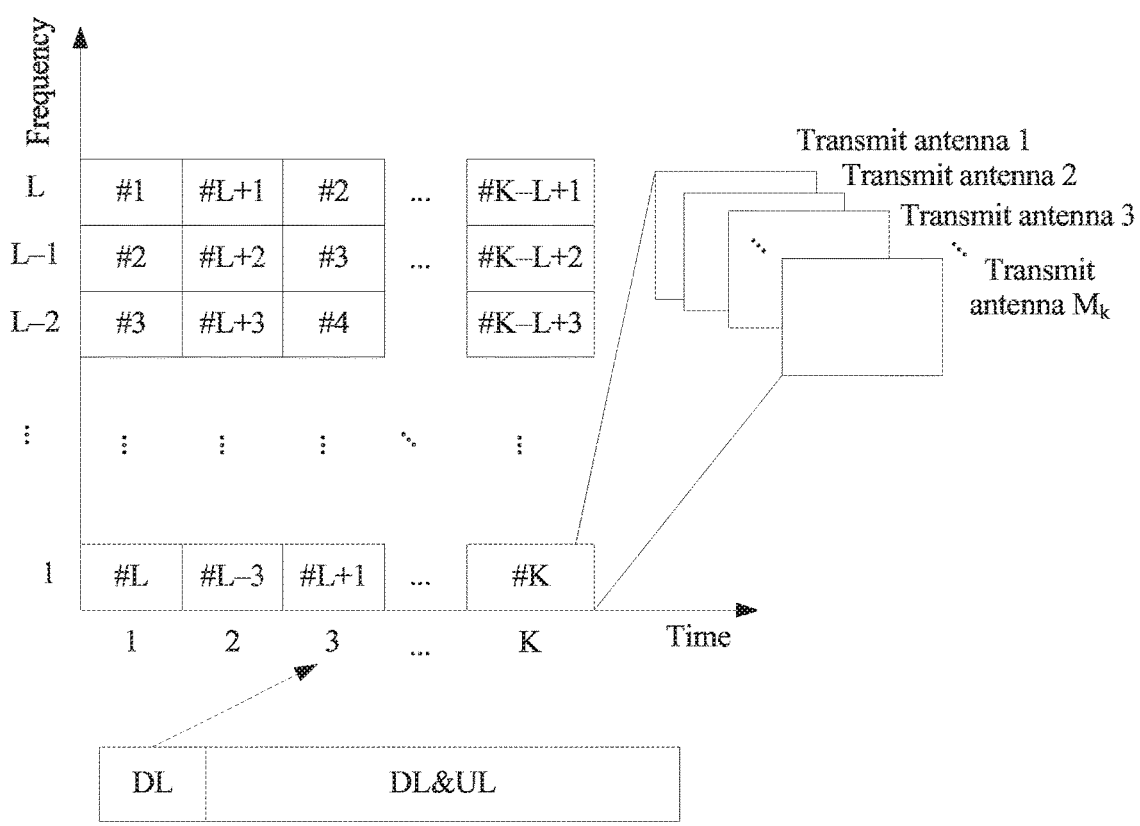
FIG. 4b is a schematic diagram of downlink half-duplex timeslot resource block allocation according to Embodiment 3 of the present invention.

For example, the transmit end may select any L transmission groups from K transmission groups. As shown in FIG. 4b, it is assumed that K=L+3, and 1, . . . , and L transmission groups are selected. First, L resource blocks on the first column from left to right along the time axis are allocated to the L transmission groups. Then, another L transmission groups are selected, and L resource blocks on the second column from left to right along the time axis are allocated to the L transmission groups, and by analogy, until all the L×L resource blocks are allocated.

It should be noted that in the process, although L is randomly selected, all the K transmission groups need to be selected, that is, at least one resource block needs to be allocated to each transmission group, and a resource block allocated to a transmission group does not overlap with that allocated to another transmission group.

For the transmit end, transmit antennas in each transmission group perform, in a manner of same time and same frequency, downlink transmission on a resource block corresponding to each transmission group. For the receive end, each receive antenna receives downlink data, and similar to a case in which L is equal to the quantity K of transmission groups, the receive end may separately obtain, by means of estimation, self-interference channels on subcarriers corresponding to transmit antennas in the L transmission groups. In addition, each transmission group may not necessarily send downlink data on each subcarrier. Therefore, each receive antenna further needs to perform interpolation in a frequency domain according to a frequency response that is obtained by means of estimation and that is of each transmission group on a corresponding subcarrier, to obtain frequency responses of transmit antennas in transmission groups on all subcarriers, so as to obtain a self-interference channel from the transmit end to the receive end by means of estimation, and further obtain interference cancellation data by performing data interference cancellation.

(ii) Overlapping Allocation.

Specifically, the transmit end may allocate one unique resource block to each transmission group, and allocate each remaining resource block to at least two transmission groups. Different from (i), in this case, a resource block allocated to a transmission group may overlap with that allocated to another transmission group, that is, in this case, each resource block may be corresponding to one or more transmission groups.

Figure 4C:
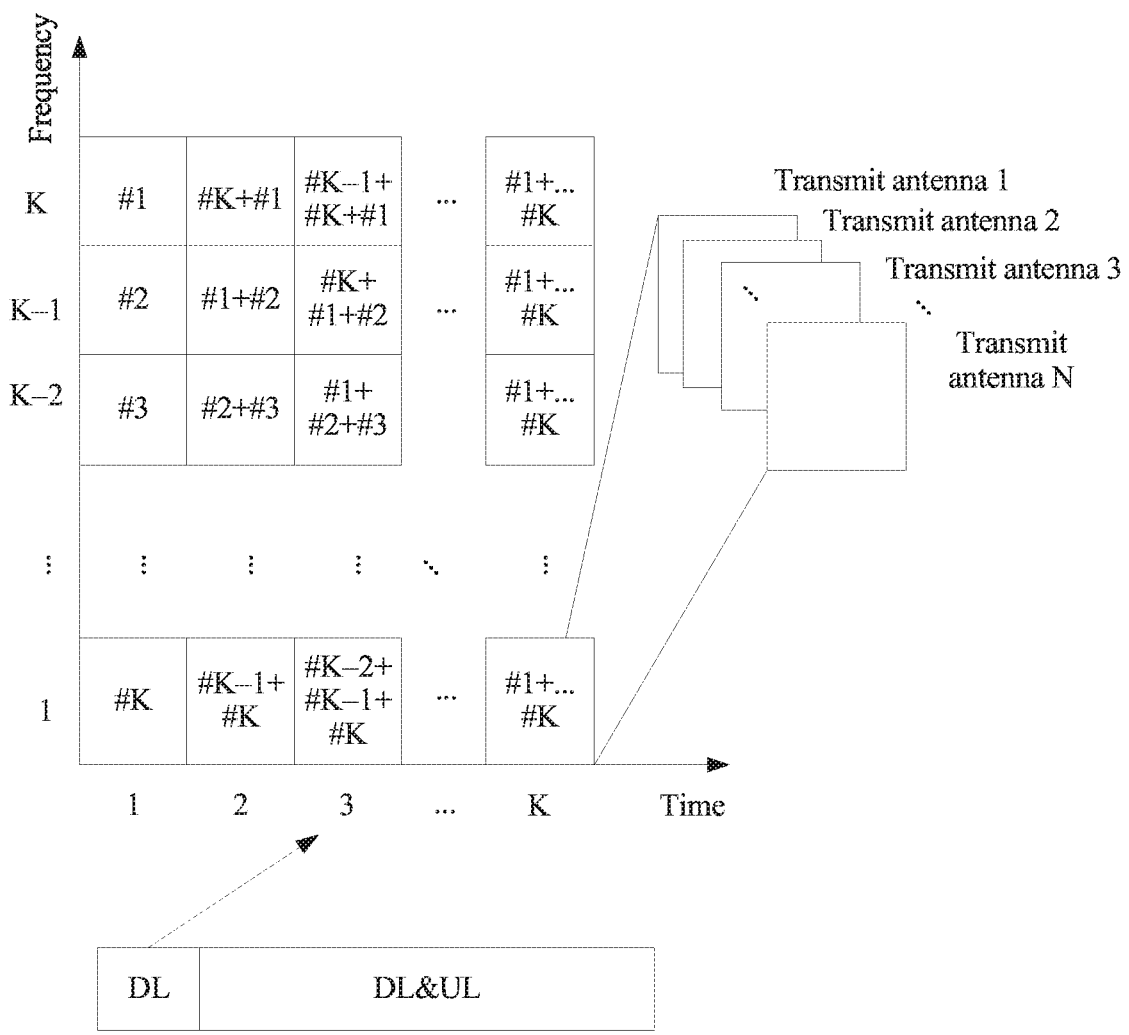
FIG. 4c is a schematic diagram of downlink half-duplex timeslot resource block allocation according to Embodiment 3 of the present invention.

If L is equal to the quantity K of transmission groups, K×K resource blocks are obtained by means of division by the transmit end, and K is equal to a quantity of transmission groups. As shown in FIG. 4c, K resource blocks on the first column from left to right along the time axis may be first allocated to the K transmission groups. Then, on the second column, each transmission group may still use downlink transmission resources whose frequency domains are the same as those of all resource blocks obtained after the division, and transmit antennas in a same transmission group sends, in a manner of same time and same frequency, downlink data by using a corresponding resource block. Specifically, for example, on a time block 1, a resource block is allocated to each transmission group, and allocated resource blocks are orthogonal in a frequency domain. That is, one resource block is allocated to a transmission group #1 on a frequency block K, and one resource block is allocated to a transmission group #2 on a frequency block K−1, and by analogy, and details are not described. On a time block 2, one resource block that is orthogonal to a resource block of the time block 1 in terms of the frequency domain is further allocated to each transmission group, and resource blocks allocated to the transmission groups are orthogonal to each other in terms of the frequency domain. In addition, the resource blocks may still use a resource block that is the same as a resource block that is of the time block 1 and that is obtained after the division, that is, a resource block is allocated to the transmission group #1 on the frequency block K−1. The transmission group #1 may still use a resource block on a frequency block K. By analogy, a resource block is allocated to each transmission group in a manner shown in FIG. 4c. Particularly, a resource block on the last column is corresponding to all the transmission groups.

For the receive end, each receive antenna may first perform, on each time block, self-interference cancellation on interference from a corresponding transmit antenna according to channel estimation that is of some self-interference channels and that is has been obtained in each frequency domain; then perform corresponding self-interference channel estimation according to a residual interference signal obtained after the self-interference cancellation, to obtain self-interference channel estimation on all resource blocks; and further perform data interference cancellation operation to obtain interference cancellation data. The self-interference channel estimation process is specifically illustrated in FIG. 4c. On the time block 1, the receive end may obtain, on the frequency block K, channel estimation of a self-interference channel corresponding to the transmission group #1. On the time block 2, the receive end suffers interference from both the transmission group #K and the transmission group #1 on the frequency block K. Therefore, self-interference cancellation may be first performed on downlink data received on the frequency block K according to self-interference channel estimation that is obtained on the time block 1 and that is corresponding to the transmission group #1, and then self-interference channel estimation corresponding to the transmission group #K is performed according to residual downlink data, that is, a self-interference signal from the transmission group #K, and by analogy, self-interference channel estimation of all the transmission groups on all the resource blocks are obtained.

If L is less than the quantity K of transmission groups, the transmit end divides the downlink transmission resource into L×L resource blocks. In this case, reference may be made to a case of interleaving allocation in (i) in which L is less than the quantity K of transmission groups. L transmission groups are selected from the K transmission groups, and an overlapping allocation operation is performed on the L transmission groups in a manner similar to that used when L is equal to the quantity K of transmission groups. A specific allocation manner is similar to that described in the, and this is not further illustrated or described in detail.

(2) In the allocation manner in (1), the downlink transmission resource allocated by the transmit end is a resource of a downlink half-duplex timeslot. However, in a practical application, the downlink full-duplex timeslot may be divided into a preset quantity of self-interference channel estimation timeslots. These self-interference channel estimation timeslots are downlink half-duplex timeslots. Therefore, a transmission resource of the downlink half-duplex timeslots are divided into resource blocks, that is, transmission resources of the preset quantity of self-interference channel estimation timeslots are divided into resource blocks. It should be noted that the preset quantity herein may be two, three, four, or the like. A specific quantity may be set according to an actual situation. In addition, resource block division in self-interference channel estimation timeslots may be performed by using different methods. That the preset quantity is 3 is used as an example for description in the following.

Figure 4D:
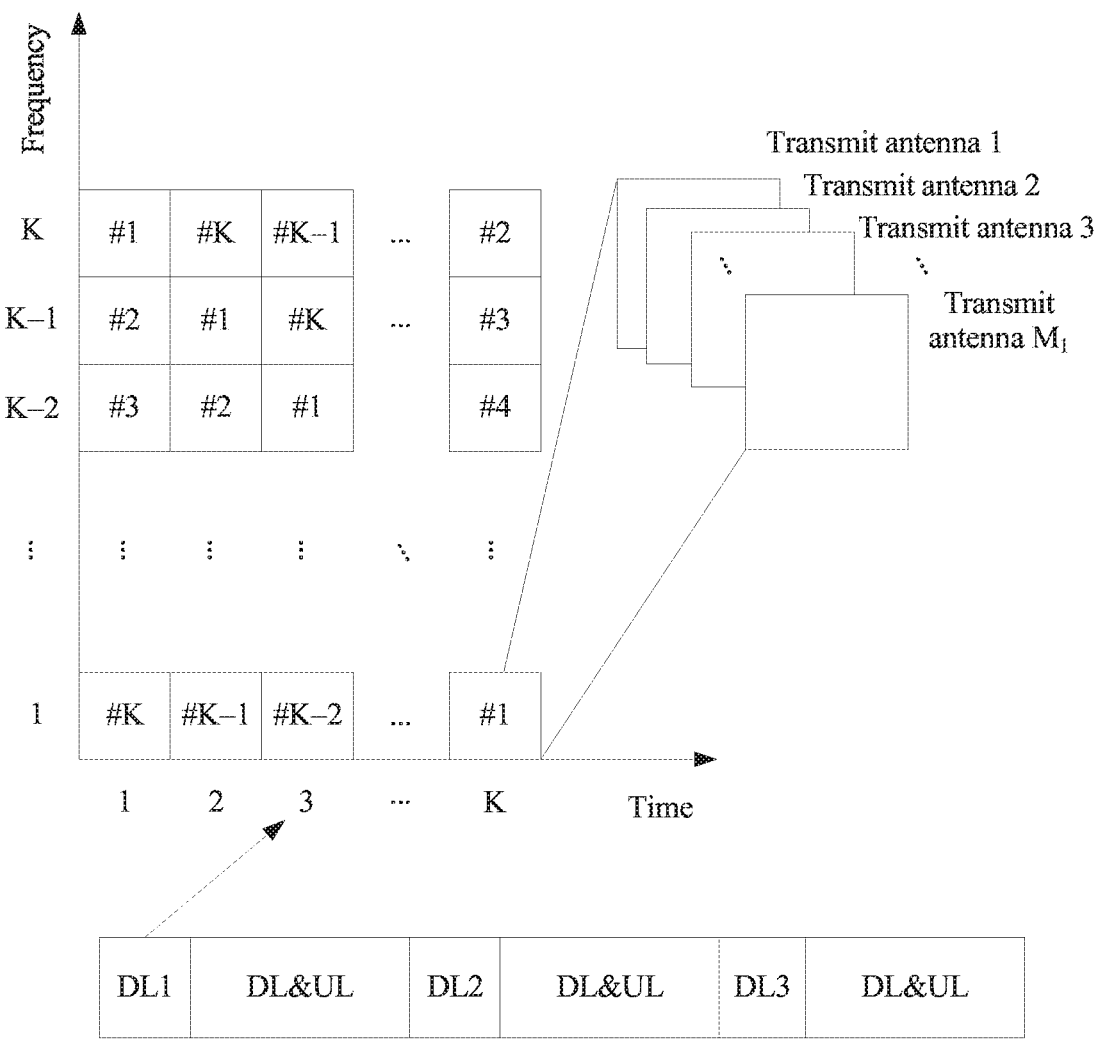
FIG. 4d is a diagram of resource block allocation of a first self-interference channel estimation timeslot according to Embodiment 3 of the present invention.
Figure 4E:
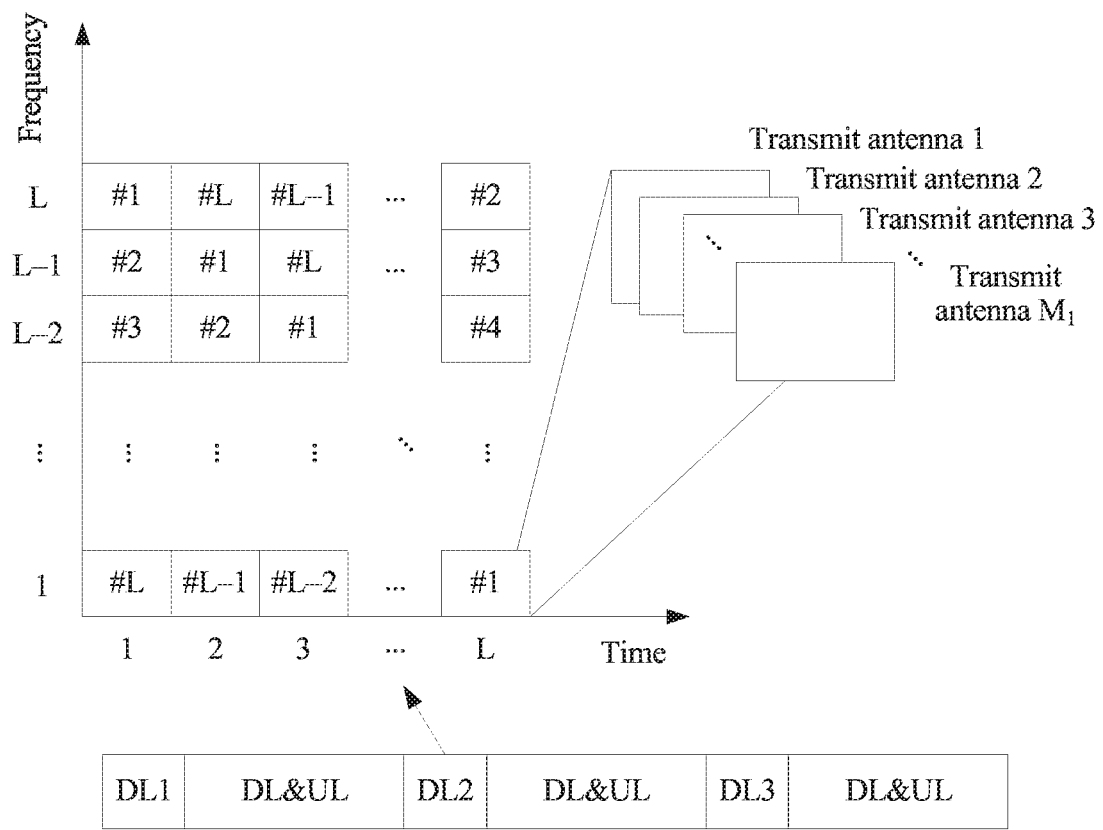
FIG. 4e is a diagram of resource block allocation of a second self-interference channel estimation timeslot according to Embodiment 3 of the present invention.
Figure 4F:
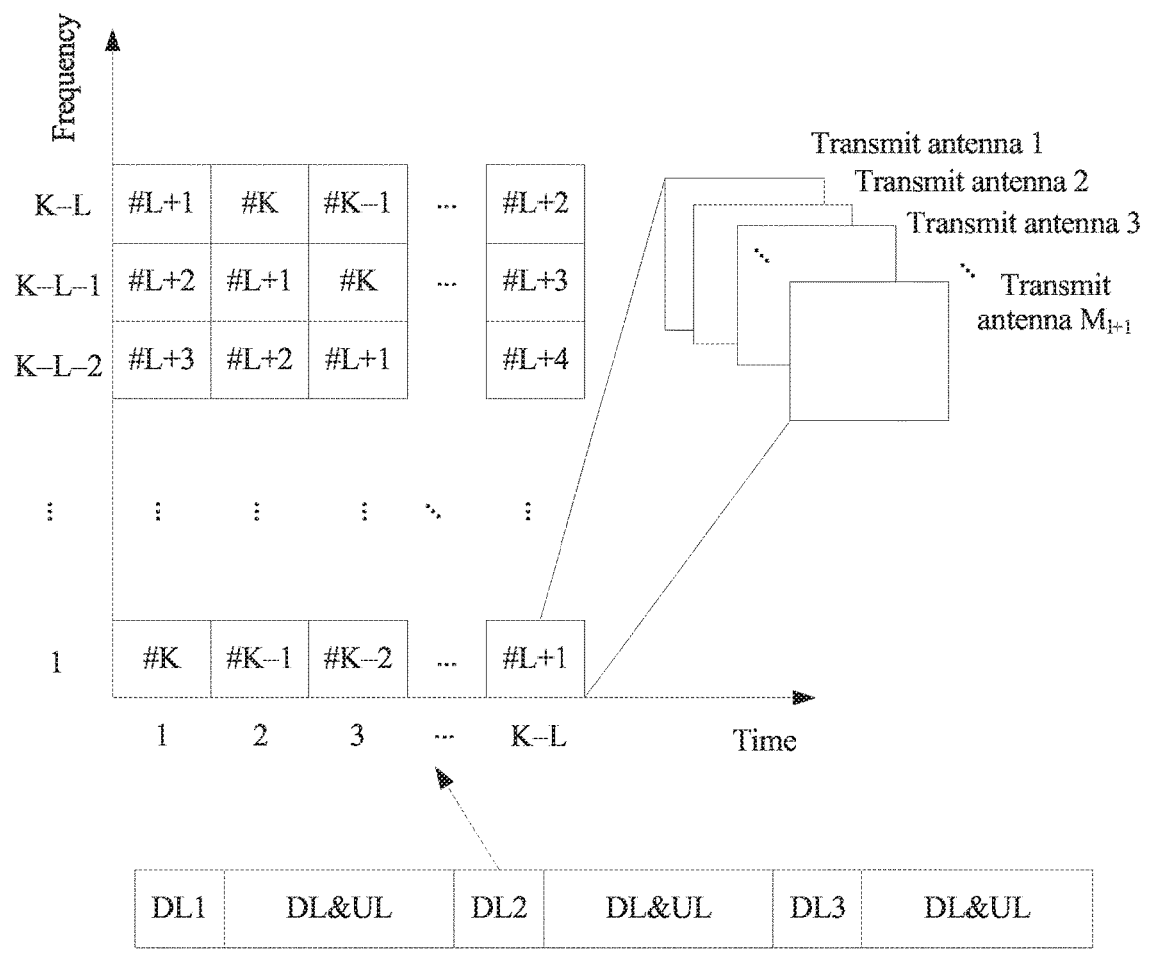
FIG. 4f is a diagram of resource block allocation of a third self-interference channel estimation timeslot according to Embodiment 3 of the present invention.

In this case, the downlink half-duplex timeslot includes three self-interference channel estimation timeslots: a first self-interference channel estimation timeslot, a second self-interference channel estimation timeslot, and a third self-interference channel estimation timeslot. As shown in FIG. 4d to FIG. 4f, FIG. 4d is a diagram of resource block allocation of a first self-interference channel estimation timeslot according to Embodiment 3 of the present invention. FIG. 4e is a diagram of resource block allocation of a second self-interference channel estimation timeslot according to Embodiment 3 of the present invention. FIG. 4f is a diagram of resource block allocation of a third self-interference channel estimation timeslot according to Embodiment 3 of the present invention. The first self-interference channel estimation timeslot is a DL1 in FIG. 4d to FIG. 4f. The second self-interference channel estimation timeslot is a DL2 in FIG. 4d to FIG. 4f. The third self-interference channel estimation timeslot is a DL3 in FIG. 4d to FIG. 4f.

Because a timeslot structure in this case is different from that in the two allocation manners, resource block division corresponding to this allocation manner is also slightly different. If this allocation manner is used, the resource block division in step S302 may be separately dividing a transmission resource of the first self-interference channel estimation timeslot, a transmission resource of the second self-interference channel estimation timeslot, and a transmission resource of the third self-interference channel estimation timeslot into resource blocks.

Specifically, the transmission resource of the first self-interference channel estimation timeslot may be divided into K×K resource blocks, and K is equal to a quantity of transmission groups. The transmission resource of the second self-interference channel estimation timeslot may be divided into L×L resource blocks, and L is less than a quantity of transmission groups. The transmission resource of the third self-interference channel estimation timeslot may be divided into (K−L)×(K−L) resource blocks.

Then, the transmit end allocates a corresponding resource block to each transmission group.

Specifically, for the resource blocks of the first self-interference channel estimation timeslot, the transmit end may allocate at least one resource block of the first self-interference channel estimation timeslot to each transmission group in a first manner, that is, in an interleaving manner in (1). A resource block allocated to a transmission group does not overlap with that allocated to another transmission group. That is, it is ensured that downlink transmission resources corresponding to the transmission groups are orthogonal to each other, and each resource block is corresponding to only one transmission group.

For the resource blocks of the second self-interference channel estimation timeslot, the transmit end may select L transmission groups from the transmission groups, and allocate at least one resource block of the second self-interference channel estimation timeslot to the L transmission groups in the first manner, that is, in an interleaving manner in (1). A resource block allocated to each of the L transmission groups does not overlap with that allocated to another one of the L transmission groups.

Similarly, for the resource blocks of the third self-interference channel estimation timeslot, the transmit end may also allocate at least one resource block of the third self-interference channel estimation timeslot to (K−L) transmission groups other than the L transmission groups in the first manner, that is, in an interleaving manner in (1). A resource block allocated to one of the (K−L) transmission groups does not overlap with that allocated to another one of the (K−L) transmission groups.

After the allocation manner is used, correspondences between the transmission groups and the resource blocks are shown in FIG. 4d to FIG. 4f.

Specifically, similar to FIG. 4a, in the first self-interference channel estimation timeslot, all the transmission groups send downlink data in a half-duplex mode, and the downlink transmission resource is divided into K×K resource blocks. The K×K resource blocks are allocated to K transmission groups in an interleaving manner. Each receive antenna may perform self-interference channel estimation in a manner described in (i), so as to perform a data interference cancellation operation to obtain interference cancellation data. In the second self-interference channel estimation timeslot, the downlink transmission resource is divided into only L×L resource blocks, and the L×L resource blocks are allocated to L transmission groups in an interleaving manner. For remaining (K−L) transmission groups, downlink data may not be sent, or be sent by using any resource block. On a resource block on which the remaining K−L transmission groups do not send downlink data, each receive antenna may directly perform self-interference channel estimation in a manner described in (i), to correspondingly update a self-interference channel estimation result obtained in the first self-interference channel estimation timeslot, so as to perform a data interference cancellation operation to obtain interference cancellation data. On a resource block on which the remaining K−L transmission groups send downlink data, each receive antenna first performs interference cancellation on downlink data, that is, an interference signal, of a transmit antenna in the remaining K−L transmission groups by using existing self-interference channel estimation, and then directly performs, according to remaining downlink data obtained after the interference cancellation, self-interference channel estimation in a manner described in (i), to correspondingly update the self-interference channel estimation result obtained in the first self-interference channel estimation timeslot, so as to perform a data interference cancellation operation to obtain interference cancellation data. On the third self-interference channel estimation timeslot, the downlink transmission resource is divided into only (K−L)×(K−L) resource blocks, and the (K−L)×(K−L) resource blocks are allocated to the (K−L) transmission groups in an interleaving manner. Similar to processing for the second self-interference channel estimation timeslot, the remaining K transmission groups may not send downlink data or send downlink data by using any resource block. In addition, the receive end also correspondingly updates, by performing an operation similar to the processing for the second self-interference channel estimation timeslot, a self-interference channel estimation result obtained from the second self-interference channel estimation timeslot, so as to perform a data interference cancellation operation to obtain interference cancellation data.

In a practical application, the first self-interference channel estimation timeslot may be a first downlink timeslot sent when communication is first established, or a downlink timeslot that appears in the communication and that is used for updating all self-interference channels. For a second self-interference channel estimation timeslot in each two first self-interference channel estimation timeslots and a design of the second self-interference channel estimation timeslot, reference may be made to the description.

In addition, timeslot allocation solutions shown in FIG. 4d to FIG. 4f merely use three self-interference channel estimation timeslots as examples. Practically, a downlink half-duplex timeslot may be divided into multiple self-interference channel estimation timeslots according to an update frequency of a self-interference channel. A transmission group is selected, and a proper resource block is allocated to the transmission group, so as to complete self-interference channel estimation and update.

S304. The transmit end sets a distance between the antenna arrays according to types and operating frequencies of the antenna arrays in which the transmit antennas are located, so that isolation between the antenna arrays is greater than preset isolation.

As described in Embodiment 1, in the prior art, to cancel self-interference in a full-duplex MIMO system, space isolation is usually performed on a transmit antenna and a receive antenna in the system, to isolate the transmit antenna from the receive antenna for a specific distance, for example, 10 centimeters (cm). However, this space isolation can bring interference suppression of only approximately 25 decibels (dB). Therefore, to cancel self-interference, radio frequency interference cancellation needs to be performed on self-interference signals that are received by the receive antennas and that are sent by all transmit antennas in the system, so as to obtain interference suppression of approximately 40 dB to 45 dB. A purpose of the radio frequency interference cancellation is to cancel self-interference between antenna arrays and a part of self-interference within the antenna array. Then interference suppression of approximately 40 dB to 45 dB is obtained according to digital interference cancellation, so as to cancel remaining self-interference.

In this embodiment, to implement the radio frequency interference cancellation, the transmit end may set a distance between antenna arrays according to types and operating frequencies of the antenna arrays in which the transmit antennas are located, so that isolation between the antenna arrays is greater than preset isolation. The isolation herein represents a level of interference suppression between the antenna arrays. Generally, the isolation is approximately 65 dB. That is, a part of self-interference between the antenna arrays is canceled in the space isolation manner according to this embodiment. Therefore, in this case, the radio frequency interference cancellation needs to be performed on only self-interference signals that are received by all receive antennas and that are sent from the transmit antennas in the antenna arrays, and there is no need to perform radio frequency interference cancellation on all the transmit antennas, so as to obtain an effect that can also be obtained by combining a space isolation manner and radio frequency interference cancellation in the prior art. Practically, a calculation amount of implementing the radio frequency interference cancellation by using hardware is in direct proportion to a quantity of transmit antennas. Therefore, complexity of the hardware for the radio frequency interference cancellation can be reduced. For the remaining self-interference, the receive end may perform digital interference cancellation on a baseband in a unified manner, so as to cancel the self-interference between the transmit end and the receive end.

Figure 5A:
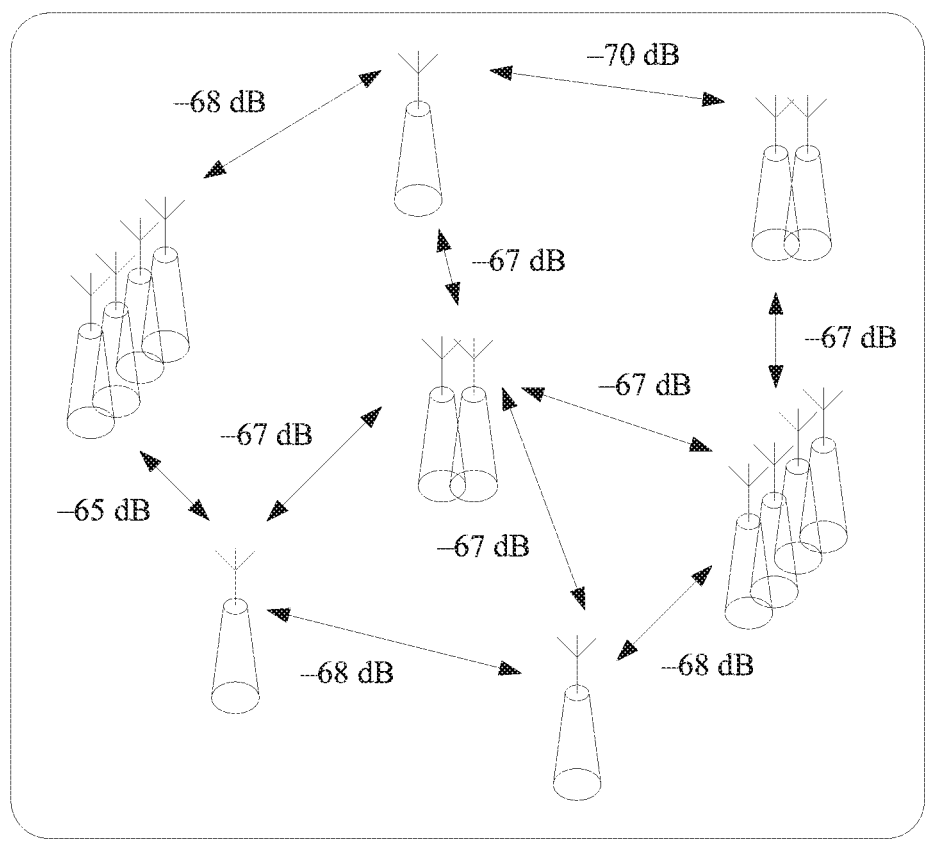
FIG. 5a is a schematic diagram of configuration of an antenna array according to Embodiment 3 of the present invention.

In specific configuration, the system may be configured as a massive MIMO system with distributed antennas. As shown in FIG. 5a, the system includes multiple antenna arrays, and a small quantity of antennas are configured for each antenna array, for example, the quantity may be 1 to 8. A number above each arrow between antenna arrays represents isolation between the antenna arrays. A specific number in FIG. 5a is merely an example rather than limitation. Practically, if antennas in the antenna arrays in the system are directional antennas and a beam of an antenna array is not completely opposite to a beam of another antenna array, a distance between antenna arrays may be set to less than 10 meters, so as to obtain space isolation greater than 65 dB. For example, for a 5 GHz operating frequency band, if antennas in the antenna arrays in the system are directional antennas and no block exists between the antenna arrays, it is assumed that in two antenna arrays, a main beam of one antenna array is completely opposite to only a side lobe of the other antenna array. Radiation power of the side lobe is generally 13 dB less than the main beam. Therefore, a distance between the two antenna arrays needs to be greater than 2 meters to obtain isolation greater than 65 dB. If antennas in the antenna arrays in the system are omnidirectional antennas with an operating frequency on a 5 gigahertz (GHz) frequency band, it is assumed that no block exists between the antenna arrays, a distance between the antenna arrays needs to be greater than 10 meters to obtain isolation of 65 dB. If the operating frequency is on a 2.4 GHz frequency band, the distance between the antenna arrays may be set into approximately 18 meters to obtain the isolation of 65 dB.

It should be noted that the distance between the antenna arrays instead of a distance between a transmit antenna and a receive antenna in each antenna array is set in this step. The distance between a transmit antenna and a receive antenna in each antenna array is set in a manner similar to that in the prior art, and details are not described herein. In addition, the transmit end may execute this step and S301 to S303, and an execution order is not limited herein.

S305. The transmit end separately sends downlink data on the downlink transmission resource corresponding to each transmission group.

Specifically, description of this step is the same as that of step S101, and details are not described herein again.

S306. The receive end receives the downlink data sent by the transmit end on the downlink transmission resource corresponding to each transmission group.

Specifically, description of this step is the same as that of step S201, and details are not described herein again.

S307. The receive end performs interference cancellation on the downlink data in each antenna array, to obtain baseband data of each antenna array.

Specifically, for example, in a practical application, an independent radio frequency interference cancellation module is configured for a receive antenna of each antenna array, the radio frequency interference cancellation module needs to only obtain a radio frequency reference signal from a transmit antenna in the antenna array by means of coupling, and to perform radio frequency interference cancellation only on downlink data that is of the transmit antenna in the antenna array and that is received by each receive antenna in the antenna array. Then, each antenna array performs, by using a low noise amplifier (Low Noise Amplifier, LNA for short), a down-converter, and an analog to digital converter (Analog To Digital Converter, ADC for short), a baseband conversion processing operation on radio frequency interference cancellation data obtained after the radio frequency interference cancellation, so as to obtain the baseband data of each antenna array and return the baseband data to a baseband processing unit in a connection manner by using a fiber or the like.

S308. The receive end estimates a self-interference channel between the transmit end and the receive end according to the downlink data on the downlink transmission resource corresponding to each transmission group.

Specifically, description of this step is the same as that of step S202, and details are not described herein again.

S309. The receive end performs digital interference cancellation on baseband data of all the antenna arrays according to the self-interference channel between the transmit end and the receive end, to obtain interference cancellation data.

Figure 5B:
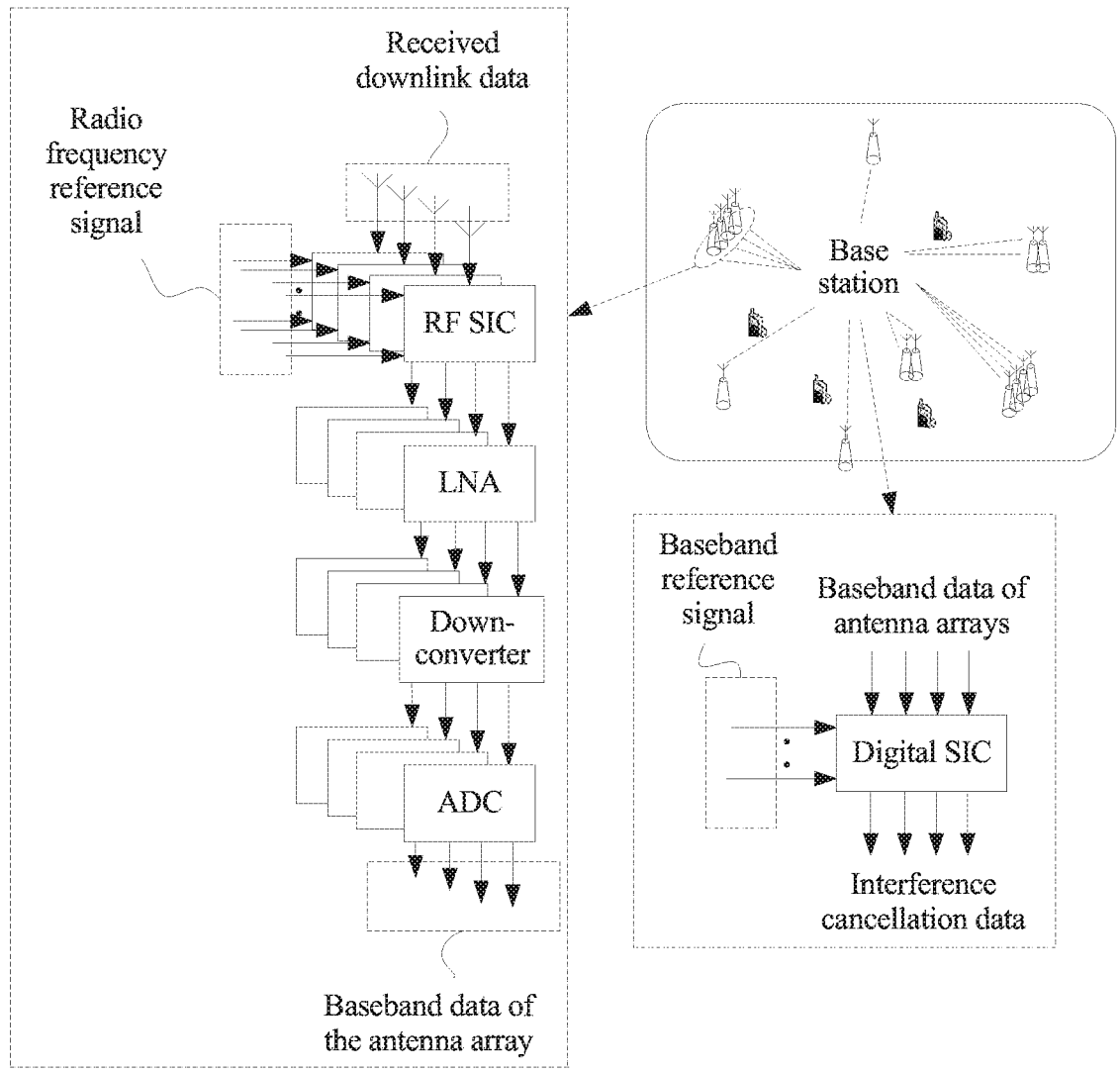
FIG. 5b is a schematic diagram of a processing procedure of a receive end according to Embodiment 3 of the present invention.

Specifically, as shown in FIG. 5b, only the radio frequency interference cancellation is performed in S307. After the baseband data is obtained, the receive end further needs to reconstruct self-interference according to the self-interference channel between the transmit end and the receive end by using a learned baseband reference signal, and perform unified digital interference cancellation on baseband data of the antenna arrays. In FIG. 5b, an antenna array including four transmit antennas and four receive antennas is used as an example. A process in which a receive end performs interference cancellation on downlink data is shown in a block diagram, and details are not described herein.

In the prior art, in order that a receive end completes data interference cancellation, for a non-orthogonal self-interference signal, a transmit end needs to allocate a downlink transmission resource to each transmit antenna during self-interference channel estimation. In comparison with the prior art, in this embodiment, the transmit end performs downlink transmission resource allocation and downlink data transmission in a unit of a transmission group, and at least one transmission group includes at least two transmission antennas, that is, a quantity of all transmission groups is less than a quantity of all transmit antennas in a system. Therefore, in relative to resource occupation of a single transmit antenna, a resource is more effectively utilized according to the technical solution in this embodiment. In addition, in the prior art, for a non-orthogonal self-interference signal, when the receive end performs self-interference channel estimation, if the quantity of all the transmit antennas in the system is N, N linear equations need to be solved on each receive antenna to obtain a self-interference channel. However, in this embodiment, one transmission group is used as an example. It is assumed that the transmission group has n transmit antennas and the system is an OFDM system. By combining n OFDM symbols, the receive end may calculate n unknowns on each subcarrier covered by a downlink transmission resource allocated to the transmission group, so as to obtain channel estimation of a self-interference channel that is on a corresponding subcarrier and that is between each transmit antenna in the transmission group and each receive antenna in an antenna array, that is, the self-interference channel may be obtained by solving n linear equations on each receive antenna. Because n is a quantity of transmit antennas in one transmission group and is far less than the quantity N of all the transmit antennas in the system, complexity of implementing the technical solution in this embodiment is low.

According to the data interference cancellation method in this embodiment, a transmit end allocates a downlink transmission resource to each transmission group, and the transmit end separately sends downlink data on the downlink transmission resource corresponding to each transmission group. According to the technical solution provided in this embodiment of the present invention, the transmit end performs downlink transmission resource allocation and downlink data transmission in a unit of a transmission group. Therefore, complexity of implementing data interference cancellation can be reduced, and a resource can be more effectively utilized.

Figure 6:
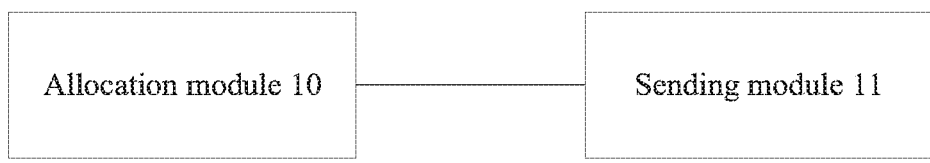
FIG. 6 is a schematic structural diagram of a transmit end according to Embodiment 4 of the present invention.

FIG. 6 is a schematic structural diagram of a transmit end according to Embodiment 4 of the present invention. As shown in FIG. 6, the transmit end includes an allocation module 10 and a sending module 11.

Specifically, the allocation module 10 is configured to allocate a corresponding downlink transmission resource to each transmission group. At least one transmission group includes at least two transmit antennas. The sending module 11 is configured to separately send downlink data on the downlink transmission resource corresponding to each transmission group.

Further, the allocation module 10 is specifically configured to divide the downlink transmission resource into resource blocks, and allocate a corresponding resource block to each transmission group.

Still further, a quantity of resource blocks is L×L, and L is less than or equal to a quantity of transmission groups. The allocation module 10 is specifically configured to: allocate at least one resource block to each transmission group, where a resource block allocated to a transmission group does not overlap with that allocated to another transmission group; or allocate one unique resource block to each transmission group, and allocate each remaining resource block to at least two transmission groups.

Still further, the quantity of resource blocks is K multiplied by K, and the K is equal to the quantity of transmission groups. The allocation module 10 is specifically configured to allocate K resource blocks to each transmission group in an overlapping allocation manner, and repeatedly allocate a resource block other than the K resource blocks to each transmission group.

Still further, a downlink transmission timeslot includes a preset quantity of self-interference channel estimation timeslots.

Still further, the preset quantity of self-interference channel estimation timeslots are a first self-interference channel estimation timeslot, a second self-interference channel estimation timeslot, and a third self-interference channel estimation timeslot. A quantity of resource blocks of the first self-interference channel estimation timeslot is K×K, and K is equal to a quantity of transmission groups. A quantity of resource blocks of the second self-interference channel estimation timeslot is L×L, and L is less than the quantity of transmission groups. A quantity of resource blocks of the third self-interference channel estimation timeslot is (K−L)× (K−L). The allocation module 10 is specifically configured to: allocate at least one resource block of the first self-interference channel estimation timeslot to each transmission group, where a resource block allocated to a transmission group does not overlap with that allocated to another transmission group; select L transmission groups from all the transmission groups, and allocate at least one resource block of the second self-interference channel estimation timeslot to the L transmission groups, where a resource block allocated to one of the L transmission groups does not overlap with that allocated to another one of the L transmission groups; and allocate at least one resource block of the third self-interference channel estimation timeslot to (K−L) transmission groups other than the L transmission groups, where a resource block allocated to one of the (K−L) transmission groups does not overlap with that allocated to another one of the (K−L) transmission groups.

The transmit end provided in this embodiment includes: an allocation module 10, configured to allocate a corresponding downlink transmission resource to each transmission group, where at least one transmission group includes at least two transmit antennas; and a sending module 11, configured to separately send downlink data on the downlink transmission resource corresponding to each transmission group. According to the technical solution provided in this embodiment of the present invention, the transmit end performs downlink transmission resource allocation and downlink data transmission in a unit of a transmission group. Therefore, complexity of implementing data interference cancellation can be reduced, and a resource can be more effectively utilized.

Figure 7:
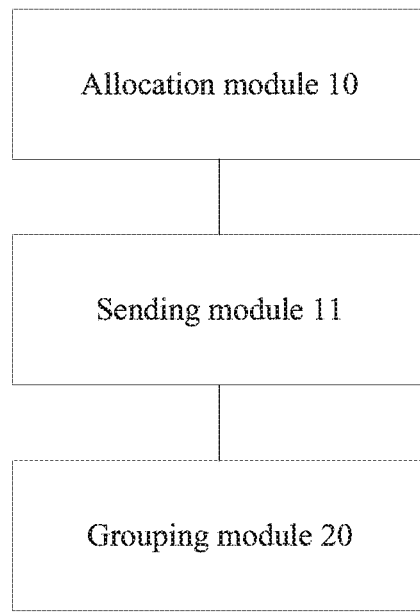
FIG. 7 is a schematic structural diagram of a transmit end according to Embodiment 5 of the present invention.

FIG. 7 is a schematic structural diagram of a transmit end according to Embodiment 5 of the present invention. As shown in FIG. 7, the transmit end includes: an allocation module 10, a sending module 11, and a classification module 20. The allocation 10 and the sending module 11 are the same as those in Embodiment 4, and details are not described herein again.

Specifically, the grouping module 20 is configured to group transmit antennas in all antenna arrays to obtain each transmission group.

Further, the grouping module 20 is specifically configured to group the transmit antennas according to a quantity of all antenna arrays and a quantity of transmit antennas in each antenna array to obtain each transmission group.

The transmit end provided in this embodiment includes: an allocation module 10, configured to allocate a corresponding downlink transmission resource to each transmission group, where at least one transmission group includes at least two transmit antennas; and a sending module 11, configured to separately send downlink data on the downlink transmission resource corresponding to each transmission group. According to the technical solution provided in this embodiment of the present invention, the transmit end performs downlink transmission resource allocation and downlink data transmission in a unit of a transmission group. Therefore, complexity of implementing data interference cancellation can be reduced, and a resource can be more effectively utilized.

Figure 8:
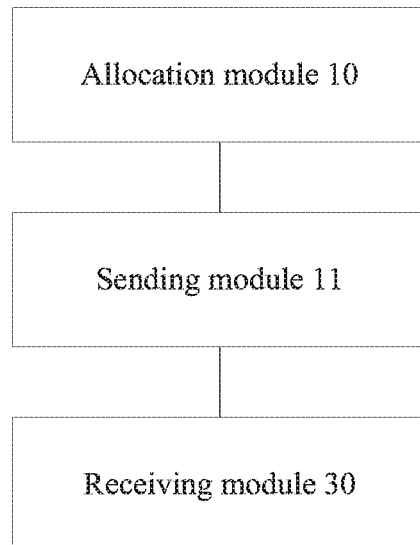
FIG. 8 is a schematic structural diagram of a transmit end according to Embodiment 6 of the present invention.

FIG. 8 is a schematic structural diagram of a transmit end according to Embodiment 6 of the present invention. As shown in FIG. 8, the transmit end includes: an allocation module 10, a sending module 11, and a receiving module 30. The allocation 10 and the sending module 11 are the same as those in Embodiment 4, and details are not described herein again.

Specifically, the receiving module 30 is configured to receive a configuration message of a management network element, and group transmit antennas according to the configuration message, where the configuration message includes grouping information of the transmit antennas.

The transmit end provided in this embodiment includes: an allocation module 10, configured to allocate a corresponding downlink transmission resource to each transmission group, where at least one transmission group includes at least two transmit antennas; and a sending module 11, configured to separately send downlink data on the downlink transmission resource corresponding to each transmission group. According to the technical solution provided in this embodiment of the present invention, the transmit end performs downlink transmission resource allocation and downlink data transmission in a unit of a transmission group. Therefore, complexity of implementing data interference cancellation can be reduced, and a resource can be more effectively utilized.

Figure 9:
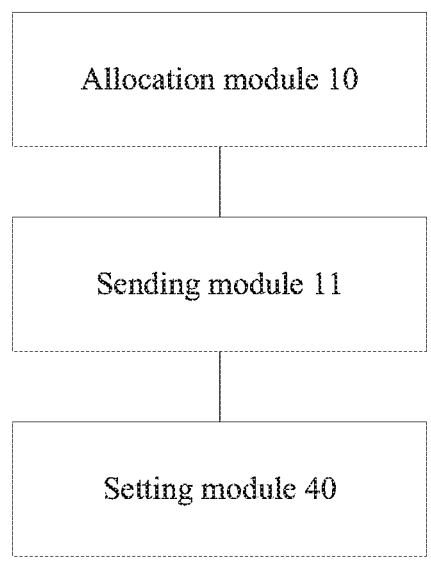
FIG. 9 is a schematic structural diagram of a transmit end according to Embodiment 7 of the present invention.

FIG. 9 is a schematic structural diagram of a transmit end according to Embodiment 7 of the present invention. As shown in FIG. 9, the transmit end includes: an allocation module 10, a sending module 11, and a setting module 40. The allocation 10 and the sending module 11 are the same as those in Embodiment 4, and details are not described herein again.

Specifically, the setting module 40 is configured to set a distance between the antenna arrays according to types and operating frequencies of the antenna arrays in which the transmit antennas are located, so that isolation between the antenna arrays is greater than preset isolation.

The transmit end provided in this embodiment includes: an allocation module 10, configured to allocate a corresponding downlink transmission resource to each transmission group, where at least one transmission group includes at least two transmit antennas; and a sending module 11, configured to separately send downlink data on the downlink transmission resource corresponding to each transmission group. According to the technical solution provided in this embodiment of the present invention, the transmit end performs downlink transmission resource allocation and downlink data transmission in a unit of a transmission group. Therefore, complexity of implementing data interference cancellation can be reduced, and a resource can be more effectively utilized.

Figure 10:
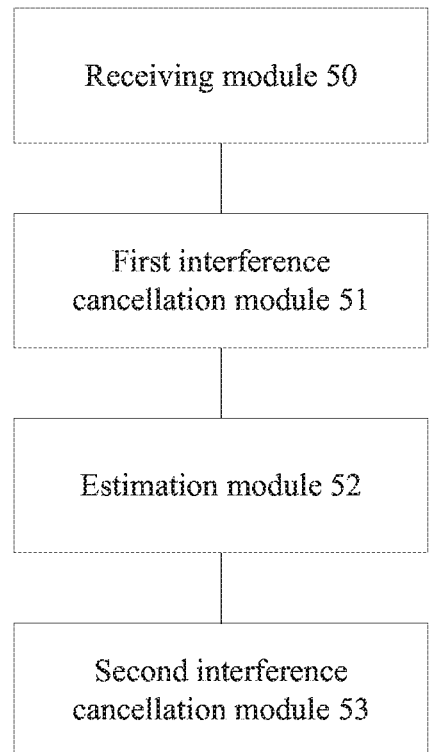
FIG. 10 is a schematic structural diagram of a receive end according to Embodiment 8 of the present invention.

FIG. 10 is a schematic structural diagram of a receive end according to Embodiment 8 of the present invention. As shown in FIG. 10, the receive end includes: a receiving module 50, a first interference cancellation module 51, an estimation module 52, and a second interference cancellation module 53.

Specifically, the receiving module 50 is configured to receive downlink data sent by a transmit end on a downlink transmission resource corresponding to each transmission group, where at least one transmission group includes at least two transmit antennas, and isolation between antenna arrays in which the transmit antennas are located is greater than preset isolation. The first interference cancellation module 51 is configured to perform interference cancellation on the downlink data in each antenna array, to obtain baseband data of each antenna array. The estimation module 52 is configured to estimate a self-interference channel between the transmit end and the receive end according to the downlink data on the downlink transmission resource corresponding to each transmission group. The second interference cancellation module 53 is configured to perform digital interference cancellation on the baseband data of all the antenna arrays according to the self-interference channel between the transmit end and the receive end, to obtain interference cancellation data.

The receive end provided in this embodiment includes: a receiving module 50, configured to receive downlink data sent by a transmit end on a downlink transmission resource corresponding to each transmission group, where at least one transmission group includes at least two transmit antennas, and isolation between antenna arrays in which the transmit antennas are located is greater than preset isolation; a first interference cancellation module 51, configured to perform interference cancellation on the downlink data in each antenna array, to obtain baseband data of each antenna array; an estimation module 52, configured to estimate a self-interference channel between the transmit end and the receive end according to the downlink data on the downlink transmission resource corresponding to each transmission group; and a second interference cancellation module 53, configured to perform digital interference cancellation on the baseband data of all the antenna arrays according to the self-interference channel between the transmit end and the receive end, to obtain interference cancellation data. According to the technical solution provided in this embodiment of the present invention, complexity of implementing data interference cancellation estimation can be reduced, and a resource can be more effectively utilized.

Figure 11:
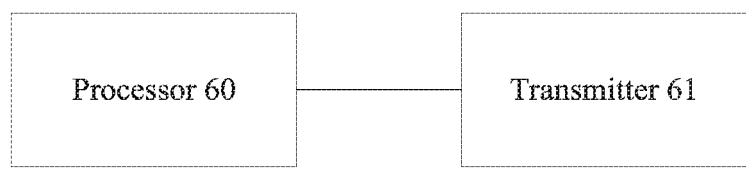
FIG. 11 is a schematic structural diagram of a transmit end according to Embodiment 9 of the present invention.

FIG. 11 is a schematic structural diagram of a transmit end according to Embodiment 9 of the present invention. As shown in FIG. 11, the transmit end includes a processor 60 and a transmitter 61.

Specifically, the processor 60 is configured to allocate a corresponding downlink transmission resource to each transmission group. At least one transmission group includes at least two transmit antennas. The transmitter 61 is configured to separately send downlink data on the downlink transmission resource corresponding to each transmission group.

Specifically, the processor 600 is further configured to group transmit antennas in all antenna arrays to obtain each transmission group.

Still further, the processor 600 is specifically configured to group the transmit antennas according to a quantity of all antenna arrays and a quantity of transmit antennas in each antenna array to obtain each transmission group.

Still further, the processor 60 is specifically configured to divide the downlink transmission resource into resource blocks, and allocate a corresponding resource block to each transmission group.

Still further, a quantity of resource blocks is L×L, and L is less than or equal to a quantity of transmission groups. The processor 60 is specifically configured to: allocate at least one resource block to each transmission group, where a resource block allocated to a transmission group does not overlap with that allocated to another transmission group; or allocate one unique resource block to each transmission group, and allocate each remaining resource block to at least two transmission groups.

Still further, a downlink transmission timeslot includes a preset quantity of self-interference channel estimation timeslots.

Still further, the preset quantity of self-interference channel estimation timeslots are a first self-interference channel estimation timeslot, a second self-interference channel estimation timeslot, and a third self-interference channel estimation timeslot.

A quantity of resource blocks of the first self-interference channel estimation timeslot is K×K, and K is equal to a quantity of transmission groups. A quantity of resource blocks of the second self-interference channel estimation timeslot is L×L, and L is less than the quantity of transmission groups. A quantity of resource blocks of the third self-interference channel estimation timeslot is (K−L)×(K−L). The processor 60 is specifically configured to: allocate at least one resource block of the first self-interference channel estimation timeslot to each transmission group, where a resource block allocated to a transmission group does not overlap with that allocated to another transmission group; select L transmission groups from all the transmission groups, and allocate at least one resource block of the second self-interference channel estimation timeslot to the L transmission groups, where a resource block allocated to one of the L transmission groups does not overlap with that allocated to another one of the L transmission groups; and allocate at least one resource block of the third self-interference channel estimation timeslot to (K−L) transmission groups other than the L transmission groups, where a resource block allocated to one of the (K−L) transmission groups does not overlap with that allocated to another one of the (K−L) transmission groups.

Still further, the processor 60 is further configured to set a distance between the antenna arrays according to types and operating frequencies of the antenna arrays in which the transmit antennas are located, so that isolation between the antenna arrays is greater than preset isolation.

The transmit end provided in this embodiment includes: a processor 60, configured to allocate a corresponding downlink transmission resource to each transmission group, where at least one transmission group includes at least two transmit antennas; and a transmitter 61, configured to separately send downlink data on the downlink transmission resource corresponding to each transmission group. According to the technical solution provided in this embodiment of the present invention, the transmit end performs downlink transmission resource allocation and downlink data transmission in a unit of a transmission group. Therefore, complexity of implementing data interference cancellation can be reduced, and a resource can be more effectively utilized.

Figure 12:
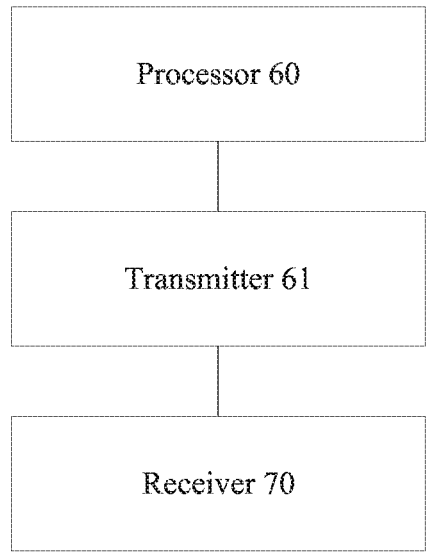
FIG. 12 is a schematic structural diagram of a transmit end according to Embodiment 10 of the present invention.

FIG. 12 is a schematic structural diagram of a transmit end according to Embodiment 10 of the present invention. As shown in FIG. 12, the transmit end includes a processor 60, a transmitter 61, and a receiver 70. The processor 600 and the transmitter 61 is the same as those in the previous embodiment, and details are not described herein again.

Specifically, the receiver 70 is configured to receive a configuration message of a management network element, and group transmit antennas according to the configuration message, where the configuration message includes grouping information of the transmit antennas.

The transmit end provided in this embodiment includes: a processor 60, configured to allocate a corresponding downlink transmission resource to each transmission group, where at least one transmission group includes at least two transmit antennas; and a transmitter 61, configured to separately send downlink data on the downlink transmission resource corresponding to each transmission group. According to the technical solution provided in this embodiment of the present invention, the transmit end performs downlink transmission resource allocation and downlink data transmission in a unit of a transmission group. Therefore, complexity of implementing data interference cancellation can be reduced, and a resource can be more effectively utilized.

Figure 13:
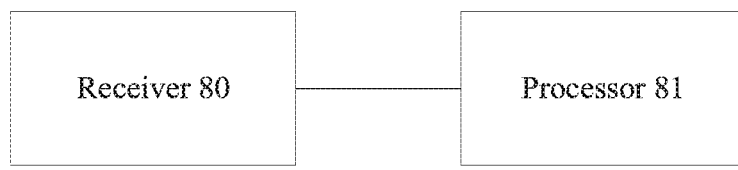
FIG. 13 is a schematic structural diagram of a receive end according to Embodiment 11 of the present invention.

FIG. 13 is a schematic structural diagram of a receive end according to Embodiment 11 of the present invention. As shown in FIG. 13, the receive end includes a receiver 80 and a processor 81.

Specifically, the receiver 80 is configured to receive downlink data sent by a transmit end on a downlink transmission resource corresponding to each transmission group, where at least one transmission group includes at least two transmit antennas, and isolation between antenna arrays in which the transmit antennas are located is greater than preset isolation. The processor 81 is configured to perform interference cancellation on the downlink data in each antenna array, to obtain baseband data of each antenna array. The processor 81 is further configured to estimate a self-interference channel between the transmit end and the receive end according to the downlink data on the downlink transmission resource corresponding to each transmission group. The processor 81 is further configured to perform digital interference cancellation on the baseband data of all the antenna arrays according to the self-interference channel between the transmit end and the receive end, to obtain interference cancellation data.

The receive end provided in this embodiment includes: a receiver 80, configured to receive downlink data sent by a transmit end on a downlink transmission resource corresponding to each transmission group, where at least one transmission group includes at least two transmit antennas, and isolation between antenna arrays in which the transmit antennas are located is greater than preset isolation; and a processor 81, configured to perform interference cancellation on the downlink data in each antenna array, to obtain baseband data of each antenna array. The processor 81 is further configured to estimate a self-interference channel between the transmit end and the receive end according to the downlink data on the downlink transmission resource corresponding to each transmission group. The processor 81 is further configured to perform digital interference cancellation on the baseband data of all the antenna arrays according to the self-interference channel between the transmit end and the receive end, to obtain interference cancellation data. According to the technical solution provided in this embodiment of the present invention, complexity of implementing data interference cancellation can be reduced, and a resource can be more effectively utilized.

Figure 14:
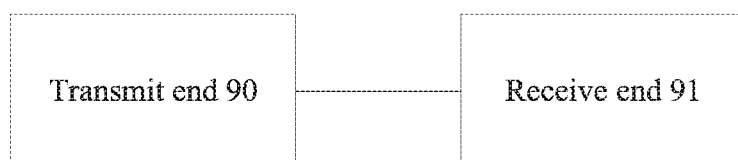
FIG. 14 is a schematic structural diagram of a system according to Embodiment 12 of the present invention.

FIG. 14 is a schematic structural diagram of a system according to Embodiment 12 of the present invention. As shown in FIG. 14, the system includes a transmit end 90 and a receive end 91.

Specifically, the transmit end 90 may be any transmit end according to Embodiment 4 to Embodiment 7, and the receive end 91 may be the receive end according to Embodiment 8.

The transmit end provided in this embodiment includes: an allocation module 10, configured to allocate a corresponding downlink transmission resource to each transmission group, where at least one transmission group includes at least two transmit antennas; and a sending module 11, configured to separately send downlink data on the downlink transmission resource corresponding to each transmission group. According to the technical solution provided in this embodiment of the present invention, the transmit end performs downlink transmission resource allocation and downlink data transmission in a unit of a transmission group. Therefore, complexity of implementing data interference cancellation can be reduced, and a resource can be more effectively utilized.

Figure 15:
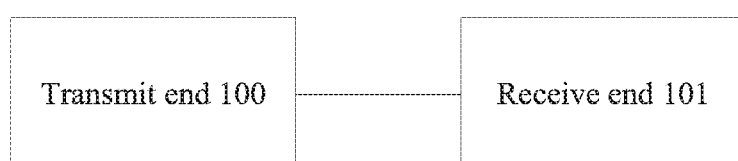
FIG. 15 is a schematic structural diagram of a system according to Embodiment 13 of the present invention.

FIG. 15 is a schematic structural diagram of a system according to Embodiment 13 of the present invention. As shown in FIG. 15, the system includes a transmit end 100 and a receive end 101.

Specifically, the transmit end 100 may be any transmit end in Embodiment 9 to Embodiment 10, and the receive end 101 may be the receive end in Embodiment 11.

The transmit end provided in this embodiment includes: a processor 60, configured to allocate a corresponding downlink transmission resource to each transmission group, where at least one transmission group includes at least two transmit antennas; and a transmitter 61, configured to separately send downlink data on the downlink transmission resource corresponding to each transmission group. According to the technical solution provided in this embodiment of the present invention, the transmit end performs downlink transmission resource allocation and downlink data transmission in a unit of a transmission group. Therefore, complexity of implementing data interference cancellation can be reduced, and a resource can be more effectively utilized.

In the embodiments provided in this application, it should be understood that the disclosed device and method may be implemented in other manners. For example, the described device embodiment is merely an example. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions in the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The storage medium includes: any medium that can store program code, such as a ROM, a RAM, a magnetic disk, or an optical disc.

Finally, it should be noted that the foregoing embodiments are merely intended for describing the technical solutions in the present embodiments, but not for limiting the present embodiments. Although the present embodiments are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in the embodiments of the present invention.

What is claimed is:

1. A method, comprising:
allocating, by a transmit end, downlink transmission resources corresponding to each transmission group of a plurality of transmission groups, wherein
at least one transmission group of the plurality of transmission groups comprises at least two transmit antennas,
a total quantity of transmission groups in the plurality of transmission groups is less than a total quantity of transmit antennas in the plurality of transmission groups,
a first transmission resource of a first self-interference channel estimation timeslot of the downlink transmission resources comprises a first plurality of resource blocks,
a total quantity of the first plurality of resource blocks is Q×Q, and
Q is less than or equal to the total quantity of transmission groups; and
separately sending, by the transmit end, downlink data on the downlink transmission resources corresponding to each transmission group of the plurality of transmission groups;
wherein allocating the downlink transmission resources corresponding to each transmission group of the plurality of transmission groups comprises
dividing, by the transmit end, the first transmission resource of the first self-interference channel estimation timeslot into the first plurality of resource blocks, and
allocating, by the transmit end, a resource block of the first plurality of resource blocks corresponding to each transmission group; and
wherein allocating the resource block of the first plurality of resource blocks corresponding to each transmission group of the plurality of transmission groups comprises
allocating, by the transmit end, one unique resource block to each transmission group, and
allocating each resource block remaining after allocating the one unique resource block to each transmission group, to at least two transmission groups.

2. The method according to claim 1, further comprising:
grouping, by the transmit end, transmit antennas in all antenna arrays of a plurality of antenna arrays to obtain each transmission group, before allocating the downlink transmission resources.

3. The method according to claim 2, wherein grouping the transmit antennas comprises:
grouping, by the transmit end, the transmit antennas according to a total quantity of the antenna arrays of the plurality of antenna arrays and a total quantity of transmit antennas in each antenna array, to obtain each transmission group.

4. The method according to claim 1, wherein a downlink transmission timeslot comprises a preset total quantity of self-interference channel estimation timeslots.

5. The method according to claim 4, wherein the preset total quantity of self-interference channel estimation timeslots includes the first self-interference channel estimation timeslot, a second self-interference channel estimation timeslot, and a third self-interference channel estimation timeslot;
wherein the total quantity of the first plurality of resource blocks of the first self-interference channel estimation timeslot is K×K, and wherein K is equal to the total quantity of transmission groups;
wherein a total quantity of a second plurality of resource blocks of the second self-interference channel estimation timeslot is L×L, and wherein L is less than the total quantity of transmission groups;
wherein a total quantity of a third plurality of resource blocks of the third self-interference channel estimation timeslot is (K−L)×(K−L); and
further comprising allocating the resource blocks corresponding to each transmission group of the plurality of transmission groups comprising:
allocating, by the transmit end, at least one resource block of the first plurality of resource blocks of the first self-interference channel estimation timeslot to each transmission group, wherein a resource block allocated to a transmission group of the plurality of transmission groups does not overlap with resource blocks allocated to other transmission groups of the plurality of transmission groups;
selecting, by the transmit end, L transmission groups from all the transmission groups, and allocating at least one resource block of the second plurality of resource blocks of the second self-interference channel estimation timeslot to the L transmission groups, wherein a resource block allocated to one of the L transmission groups does not overlap with resource blocks allocated to other transmission groups of the L transmission groups; and
allocating, by the transmit end, at least one resource block of the third plurality of resource blocks of the third self-interference channel estimation timeslot to (K−L) transmission groups other than the L transmission groups, wherein a resource block allocated to one of the (K−L) transmission groups does not overlap with resource blocks allocated to other transmission groups of the (K−L) transmission groups.

6. The method according to claim 1, further comprising:
receiving, by the transmit end, a configuration message of a management network element; and
grouping transmit antennas according to the configuration message, before allocating the downlink transmission resources, wherein the configuration message comprises grouping information of the transmit antennas.

7. The method according to claim 1, wherein allocating the resource block of the first plurality of resource blocks corresponding to each transmission group of the plurality of transmission groups comprises:
allocating, by the transmit end, at least one resource block to each transmission group, wherein a resource block allocated to a transmission group of the plurality of transmission groups does not overlap with resource blocks allocated to other transmission groups of the plurality of transmission groups.

8. The method according to claim 1, further comprising:
setting, by the transmit end, a distance between antenna arrays of a plurality of antenna arrays according to types of the antenna arrays and operating frequencies of the antenna arrays, so that isolation between the antenna arrays is greater than a preset isolation, before sending the downlink data on the downlink transmission resources, wherein the transmit antennas are located on the antenna arrays.

9. A transmit end, comprising:
a processor; and
a non-transitory computer readable storage medium storing a program for execution by the processor, the program including instructions to:
allocate downlink transmission resources corresponding to each transmission group of a plurality of transmission groups, wherein
at least one transmission group of the plurality of transmission groups comprises at least two transmit antennas
a total quantity of transmission groups in the plurality of transmission groups is less than a total quantity of transmit antennas in the plurality of transmission groups,
a first transmission resource of a first self-interference channel estimation timeslot of the downlink transmission resources comprises a first plurality of resource blocks,
a total quantity of the first plurality of resource blocks is Q×Q, and
Q is less than or equal to the total quantity of transmission groups;
separately send downlink data on the downlink transmission resources corresponding to each transmission group of the plurality of transmission groups;
wherein allocating the downlink transmission resources corresponding to each transmission group of the plurality of transmission groups comprises
dividing, by the transmit end, the first transmission resource of the first self-interference channel estimation timeslot into the first plurality of resource blocks, and
allocating, by the transmit end, a resource block of the first plurality of resource blocks corresponding to each transmission group; and
wherein allocating the resource block of the first plurality of resource blocks corresponding to each transmission group of the plurality of transmission groups comprises
allocating, by the transmit end, one unique resource block to each transmission group, and
allocating each resource block remaining after allocating the one unique resource block to each transmission group, to at least two transmission groups.

10. The transmit end according to claim 9, wherein the instructions further comprise instructions to:
group transmit antennas in all antenna arrays of a plurality of antenna arrays, to obtain each transmission group; or receive a configuration message of a management network element, and group transmit antennas according to the configuration message, wherein the configuration message comprises grouping information for the transmit antennas.

11. The transmit end according to claim 10, wherein the instructions further comprise instructions to:
group the transmit antennas according to a total quantity of all antenna arrays and a total quantity of transmit antennas in each antenna array to obtain each transmission group.

12. The transmit end according to claim 9, wherein the instructions further comprise instructions to:
divide the first transmission resource of the first self-interference channel estimation timeslot into the first plurality of resource blocks; and
allocate a resource block of the first plurality of resource blocks corresponding to each transmission group of the plurality of transmission groups.

13. The transmit end according to claim 12, wherein the instructions further comprise instructions to:
allocate at least one resource block to each transmission group of the plurality of transmission groups, wherein a resource block allocated to a transmission group of the plurality of transmission groups does not overlap with resource blocks allocated to other transmission groups of the plurality of transmission groups; or
allocate one unique resource block to each transmission group of the plurality of transmission groups, and allocate each remaining resource block after allocating one unique resource block to each transmission group of the plurality of transmission groups, to at least two transmission groups of the plurality of transmission groups.

14. The transmit end according to claim 9, wherein a downlink transmission timeslot comprises a preset total quantity of self-interference channel estimation timeslots.

15. The transmit end according to claim 14, wherein the preset total quantity of self-interference channel estimation timeslots includes the first self-interference channel estimation timeslot, a second self-interference channel estimation timeslot, and a third self-interference channel estimation timeslot;
wherein the total quantity of the first plurality of resource blocks of the first self-interference channel estimation timeslot is K×K, and wherein K is equal to the total quantity of transmission groups;
wherein a total quantity of a second plurality of resource blocks of the second self-interference channel estimation timeslot is L×L, and wherein L is less than the total quantity of transmission groups;
wherein a total quantity of a third plurality of resource blocks of the third self-interference channel estimation timeslot is (K−L)×(K−L); and
wherein the instructions further comprise instructions to:
allocate at least one resource block of the first plurality of resource blocks of the first self-interference channel estimation timeslot to each transmission group of the plurality of transmission groups, wherein a resource block allocated to a transmission group of the plurality of transmission groups does not overlap with resource blocks allocated to other transmission groups of the plurality of transmission groups;
select L transmission groups from the plurality of transmission groups;
allocate at least one resource block of the second plurality of resource blocks of the second self-interference channel estimation timeslot to the L transmission groups, wherein a resource block allocated to one of the L transmission groups does not overlap with resource blocks allocated to other transmission groups of the L transmission groups; and
allocate at least one resource block of the third plurality of resource blocks of the third self-interference channel estimation timeslot to (K−L) transmission groups other than the L transmission groups, wherein a resource block allocated to one of the (K−L) transmission groups does not overlap with resource blocks allocated to other of the (K−L) transmission groups.

16. The transmit end according to claim 9, wherein the instructions further comprise instructions to:
set a distance between antenna arrays according to types of the antenna arrays and operating frequencies of the antenna arrays, so that isolation between the antenna arrays is greater than a preset isolation, wherein the transmit antennas are located on the antenna arrays.

17. A method, comprising:
receiving, by a receive end, downlink data sent by a transmit end on downlink transmission resources corresponding to each transmission group of a plurality of transmission groups, wherein
at least one transmission group of the plurality of transmission groups comprises at least two transmit antennas,
a total quantity of transmission groups in the plurality of transmission groups is less than a total quantity of transmit antennas in the plurality of transmission groups,
a first transmission resource of a first self-interference channel estimation timeslot of the downlink transmission resources comprises a first plurality of resource blocks,
a total quantity of the first plurality of resource blocks is Q×Q,
Q is less than or equal to the total quantity of transmission groups,
isolation between antenna arrays of a plurality of antenna arrays is greater than a preset isolation, and
the transmit antennas are located on the antenna arrays;
performing, by the receive end, interference cancellation on the downlink data in each antenna array, to obtain baseband data of each antenna array;
estimating, by the receive end, a self-interference channel between the transmit end and the receive end, according to the downlink data on the downlink transmission resources corresponding to each transmission group;
performing, by the receive end, digital interference cancellation on baseband data of all of the antenna arrays according to the self-interference channel between the transmit end and the receive end, to obtain interference cancellation data;
allocating, by the transmit end, downlink transmission resources corresponding to each transmission group of the plurality of transmission groups, wherein the allocating comprises
dividing, by the transmit end, the first transmission resource of the first self-interference channel estimation timeslot into the first plurality of resource blocks, and
allocating, by the transmit end, a resource block of the first plurality of resource blocks corresponding to each transmission group; and wherein allocating the resource block of the first plurality of resource blocks corresponding to each transmission group of the plurality of transmission groups comprises
   allocating, by the transmit end, one unique resource block to each transmission group, and
   allocating each resource block remaining after allocating the one unique resource block to each transmission group, to at least two transmission groups.

18. A receive end, comprising:
a processor; and
a non-transitory computer readable storage medium storing a program for execution by the processor, the program including instructions to:
   receive downlink data sent by a transmit end on downlink transmission resources corresponding to each transmission group of a plurality of transmission groups, wherein
      at least one transmission group of the plurality of transmission groups comprises at least two transmit antennas,
      a total quantity of transmission groups in the plurality of transmission groups is less than a total quantity of transmit antennas in the plurality of transmission groups,
      a first transmission resource of a first self-interference channel estimation timeslot of the downlink transmission resources comprises a first plurality of resource blocks,
      a total quantity of the first plurality of resource blocks is Q×Q,
      Q is less than or equal to the total quantity of transmission groups, and
      isolation between antenna arrays of a plurality of antenna arrays in which the transmit antennas are located is greater than a preset isolation;
   perform interference cancellation on the downlink data in each antenna array of the plurality of antenna arrays, to obtain baseband data of each antenna array;
   estimate a self-interference channel between the transmit end and the receive end according to the downlink data on the downlink transmission resources corresponding to each transmission group;
   perform digital interference cancellation on the baseband data of all antenna arrays of the plurality of antenna arrays according to the self-interference channel between the transmit end and the receive end, to obtain interference cancellation data;
   allocate, by the transmit end, downlink transmission resources corresponding to each transmission group of the plurality of transmission groups, wherein the allocating comprises
      dividing, by the transmit end, the first transmission resource of the first self-interference channel estimation timeslot into the first plurality of resource blocks, and
      allocating, by the transmit end, a resource block of the first plurality of resource blocks corresponding to each transmission group; and
   wherein allocating the resource block of the first plurality of resource blocks corresponding to each transmission group of the plurality of transmission groups comprises
      allocating, by the transmit end, one unique resource block to each transmission group, and
      allocating each resource block remaining after allocating the one unique resource block to each transmission group, to at least two transmission groups.

* * * * *